United States Patent [19]

Matsuda

[11] Patent Number: 4,936,636
[45] Date of Patent: Jun. 26, 1990

[54] ANTI-SKID BRAKE CONTROL SYSTEM FOR AUTOMOTIVE VEHICLE WITH FEATURE OF DERIVATION OF ROAD SURFACE FRICTION REPRESENTATIVE DATA

[75] Inventor: Toshiro Matsuda, Kanagawa, Japan

[73] Assignee: Nissan Motor Company, Limited, Yokohama, Japan

[21] Appl. No.: 343,190

[22] Filed: Apr. 25, 1989

[30] Foreign Application Priority Data

Apr. 25, 1988 [JP] Japan .................................. 63-100182

[51] Int. Cl.⁵ ............................................... B60T 8/32
[52] U.S. Cl. ...................................... 303/103; 303/97; 303/104; 303/106
[58] Field of Search ................. 303/106, 104, 103, 97, 303/105, 102, 91, 95, 96, 99, 100, 107, 108, 110; 188/181 C, 181 R, 181 A; 364/426.02, 426.01

[56] References Cited

U.S. PATENT DOCUMENTS

| | | |
|---|---|---|
| 4,408,290 | 10/1983 | Kubo et al. . |
| 4,569,560 | 2/1986 | Kubo . |
| 4,597,052 | 6/1986 | Matsuda . |
| 4,637,663 | 1/1987 | Matsuda . |
| 4,656,588 | 4/1987 | Kubo . |
| 4,660,146 | 4/1987 | Kubo . |
| 4,662,686 | 5/1987 | Matsuda . |
| 4,663,715 | 5/1987 | Kubo . |
| 4,663,716 | 5/1987 | Kubo . |
| 4,665,491 | 5/1987 | Kubo . |
| 4,667,176 | 5/1987 | Matsuda . |
| 4,669,045 | 5/1987 | Kubo . |
| 4,669,046 | 5/1987 | Kubo . |
| 4,674,049 | 6/1987 | Kubo . |
| 4,674,050 | 6/1987 | Kubo . |
| 4,679,146 | 7/1987 | Kubo . |
| 4,680,713 | 7/1987 | Kubo . |
| 4,680,714 | 7/1987 | Kubo . |
| 4,682,295 | 7/1987 | Kubo . |
| 4,683,537 | 7/1987 | Matsuda . |
| 4,704,684 | 11/1987 | Kubo . |
| 4,718,013 | 1/1988 | Kubo . |
| 4,780,818 | 10/1988 | Kubo . |
| 4,855,917 | 8/1989 | Sawano et al. ................... 303/97 X |

FOREIGN PATENT DOCUMENTS

60-261767 12/1985 Japan .
2154763A 9/1985 United Kingdom .
2154765A 9/1985 United Kingdom .

*Primary Examiner*—Douglas C. Butler
*Attorney, Agent, or Firm*—Foley & Lardner, Schwartz, Jeffery, Schwaab, Mack, Blumenthal & Evans

[57] ABSTRACT

An anti-skid brake control system monitors wheel deceleration during a period from a timing at which vehicular braking operation is initiated to a timing at which anti-skid brake control becomes active. Because the magnitude of wheel deceleration during the period set forth above is approximately inversely proportional to a road friction, the difference of deceleration can be a road friction indicative data. A vehicle body deceleration gradient data for the first skid control cycle is approximated or projected on the basis of the road friction indicative data so as to derive a projected vehicle body speed indicative data and a target wheel speed indicative data for the first skid control cycle.

11 Claims, 12 Drawing Sheets

$$\left( Vwn = \frac{K \cdot Nn}{Tn - Tn+1} \right)$$

ANTI-SKID BRAKE CONTROL SYSTEM FOR AUTOMOTIVE VEHICLE WITH FEATURE OF DERIVATION OF ROAD SURFACE FRICTION REPRESENTATIVE DATA

BACKGROUND OF THE INVENTION

1. Field of the Invention

The present invention relates generally to an anti-skid brake control system for automotive vehicle, which controls braking pressure in order to maintain wheel slippage at an optimum level for optimal vehicular braking performance. More specifically, the invention relates to a technology for detecting road surface friction level for precise control of skid control cycle and adapting skid control schedule to the road friction level.

2. Description of the Background Art

Recently, various constructions and operations of anti-skid vehicular brake control systems have been proposed for improving deceleration performance of an automotive vehicle for assure safety in braking. In the anti-skid brake control system, skid control cycle, in which braking pressure is controlled or adjusted so as to avoid excessive wheel slippage due to locking or skiding of wheel, is initiated in response to a wheel deceleration (negative value of acceleration). During anti-skid brake control, braking pressure is adjusted over one or more skid control cycles for maintaining braking pressure in the vicinity of lock pressure to maintain wheel slippage at an optimal level, i.e. 10 to 20%.

One of the typical process of anti-skid brake control had been disclosed in Japanese Patent First (unexamined) Publication (Tokkai) Showa 60-261769. In the disclosed system, a vehicle body speed representative data is derived on the basis of a wheel speed indicative data. The system derives an approximated road friction indicative data on the basis of gradient of deceleration of wheel speed. Such technology is practically useful for second and subsequent skid cycles of anti-skid control. However, for the first skid control cycle, the gradient data cannot be obtained to make it impossible to derive the road friction indicative data. Therefore, it is usual technology to use a predetermined gradient value for approximating the deceleration of the vehicle body for the first skid control cycle. For this, the predetermined gradient value has to be set in view of a certain road friction level. Selection of the road friction level is difficult matter. Namely, when the gradient value is set in view of relatively low road friction level, braking pressure reduction is taken placed at too early timing to optimize braking characteristics. On the other hand, when the gradient value is set in view of relatively high friction level, excessive wheel slippage may occur at low friction road to cause expansion of the braking distance.

SUMMARY OF THE INVENTION

Therefore, it is an object of the present invention to provide an anti-skid brake control system which enables to approximate road friction representative data and whereby enables to derive a gradient value for the first skid control cycle.

Another object of the invention is to provide a technology of deriving the road friction data upon initiation of the braking operation.

In order to accomplish the aforementioned and other objects, an anti-skid brake control system, according to the present invention, monotors wheel deceleration during a period from a timing at which vehicular braking operation is initiated to a timing at which anti-skid brake control becomes active. Because the magnitude of wheel deceleration during the period set forth above is approximately inversely proportional to a road friction, the difference of deceleration can be a road friction indicative data. A vehicle body deceleration gradient data for the first skid control cycle is approximated or projected on the basis of the road friction indicative data so as to derive a projected vehicle body speed indicative data and a target wheel speed indicative data for the first skid control cycle. According to one aspect of the invention, an anti-skid brake control system for an automotive vehicle, comprises:

a braking circuit including a wheel cyclinder for generating braking force for decelerating a vehicular wheel in response to a manual braking operation;

a pressure control valve disposed within the braking circuit for controlling braking force to be generated in the wheel cylinder depending upon the vehicular braking condition, the pressure control valve increasing the braking force in the wheel cylinder in a first mode and decreasing the braking force in the wheel cylinder in a second mode;

a wheel speed data generating means for monitoring rotation speed of the vehicular wheel to produce a wheel speed indicative data;

first means deriving a vehicular braking condition on the basis of the wheel speed indicative data for outputting a control signal for controlling operational mode of the pressure control valve means according to a predetermined schedule in each skid control cycle, in which the pressure control valve operational mode is selected between the first mode and second mode according to the predetermined schedule, and second means responsive to initiation of vehicular braking operation for monitoring variation of the wheel speed indicative data for detecting friction level of a road surface for adjusting variation rate of the braking pressure in the wheel cylinder in the second mode.

The second means may be active for the first cycle of skid control operation for selecting deceleration rate in the second mode. The second means may monitor variation of wheel speed indicative data during a period from initiation of the vehicular braking operation to initiation of the second mode operation in the first skid control cycle for deriving a discrimination data and detect the road friction level on the basis of the discrimination data.

Preferably, the second means detects the discrimination data representative of a friction level higher than a predetermined friction criterion for selecting a first smaller variation rate and otherwise selecting a second greater variation rate. The pressure control valve linearly decreases the braking pressure at a predetermined pressure decreasing gradient when the second greater variation rate is selected and intermittently decreases the braking pressure at the predetermined pressure decreasing gradient with a given interval in which the braking pressure is maintained constant when the first smaller variation rate is selected.

According to another aspect of the invention, an anti-skid brake control system for an automotive vehicle, comprises:

a braking circuit including a wheel cylinder for generating braking force for decelerating a vehicular wheel in response to a manual braking operation;

a pressure control valve disposed within the braking circuit for controlling braking force to be generated in the wheel cylinder depending upon the vehicular braking condition, the pressure control valve increasing the braking force in the wheel cylinder in a first mode, decreasing the braking force in the wheel cylinder rate in a second mode in which decreasing rate is set at a first given rate in a normal decreasing mode and at a second given rare smaller than the first given rate in a controlled decreasing mode;

a wheel speed data generating means for monitoring rotation speed of the vehicular wheel to produce a wheel speed indicative data;

first means deriving a vehicular braking condition on the basis of the wheel speed indicative data for outputting a control signal for controlling operational mode of the pressure control valve means according to a predetermined schedule in each skid control cycle, in which the pressure control valve operational mode is selected between the first mode and second mode according to the predetermined schedule, and second means responsive to initiation of vehicular braking operation for detecting road friction level representative parameter on the basis of the wheel speed indicative data for selecting one of the normal decreasing mode and the controlled decreasing mode in the second mode.

According to a further aspect of the invention, an anti-skid brake control system for an automotive vehicle, comprises:

a braking circuit including a wheel cylinder for generating braking force for decelerating a vehicular wheel in response to a manual braking operation;

a pressure control valve disposed within the braking circuit for controlling braking force to be generated in the wheel cylinder depending upon the vehicular braking condition, the pressure control valve increasing the braking force in the wheel cylinder in a first mode, decreasing the braking force in the wheel cylinder rate in a second mode in which decreasing rate is set at a first given rate in a normal decreasing mode and at a second given rare smaller than the first given rate in a controlled decreasing mode;

a wheel speed data generating means for monitoring rotation speed of the vehicular wheel to produce a wheel speed indicative data;

first means deriving a vehicular braking condition on the basis of the wheel speed indicative data for outputting a control signal for controlling operational mode of the pressure control valve means according to a predetermined schedule in each skid control cycle, in which the pressure control valve operational mode is selected between the first mode and second mode according to the predetermined schedule, and second means responsive to initiation of vehicular braking operation for sampling a first wheel speed data and responsive to the control signal ordering the second mode in a first skid control cycle for sampling a second wheel speed data, the second means comparing the first and second wheel speed data for detecting road friction level representative parameter on the difference between the first and second wheel speed data for selecting one of the normal decreasing mode and the controlled decreasing mode in the second mode depending upon the difference.

BRIEF DESCRIPTION OF THE DRAWINGS

The present invention will be understood from the detailed description given hereblow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1A:
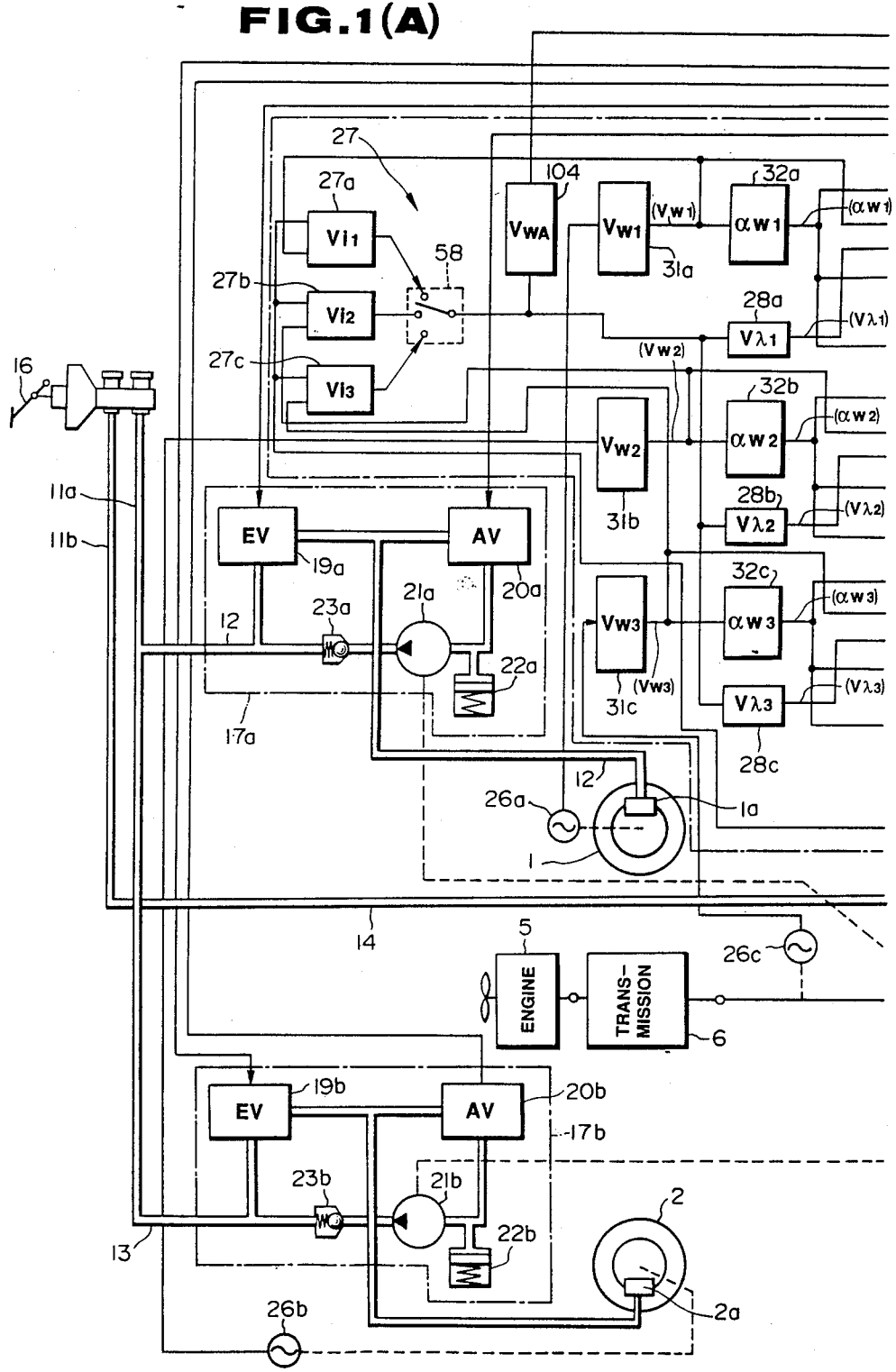
FIGS. 1(A) and 1(B) are block diagram of an overall wheel slip control system, to which the preferred embodiment of a vehicle speed representing value derivation system according to the invention, is applied.
Figure 1B:
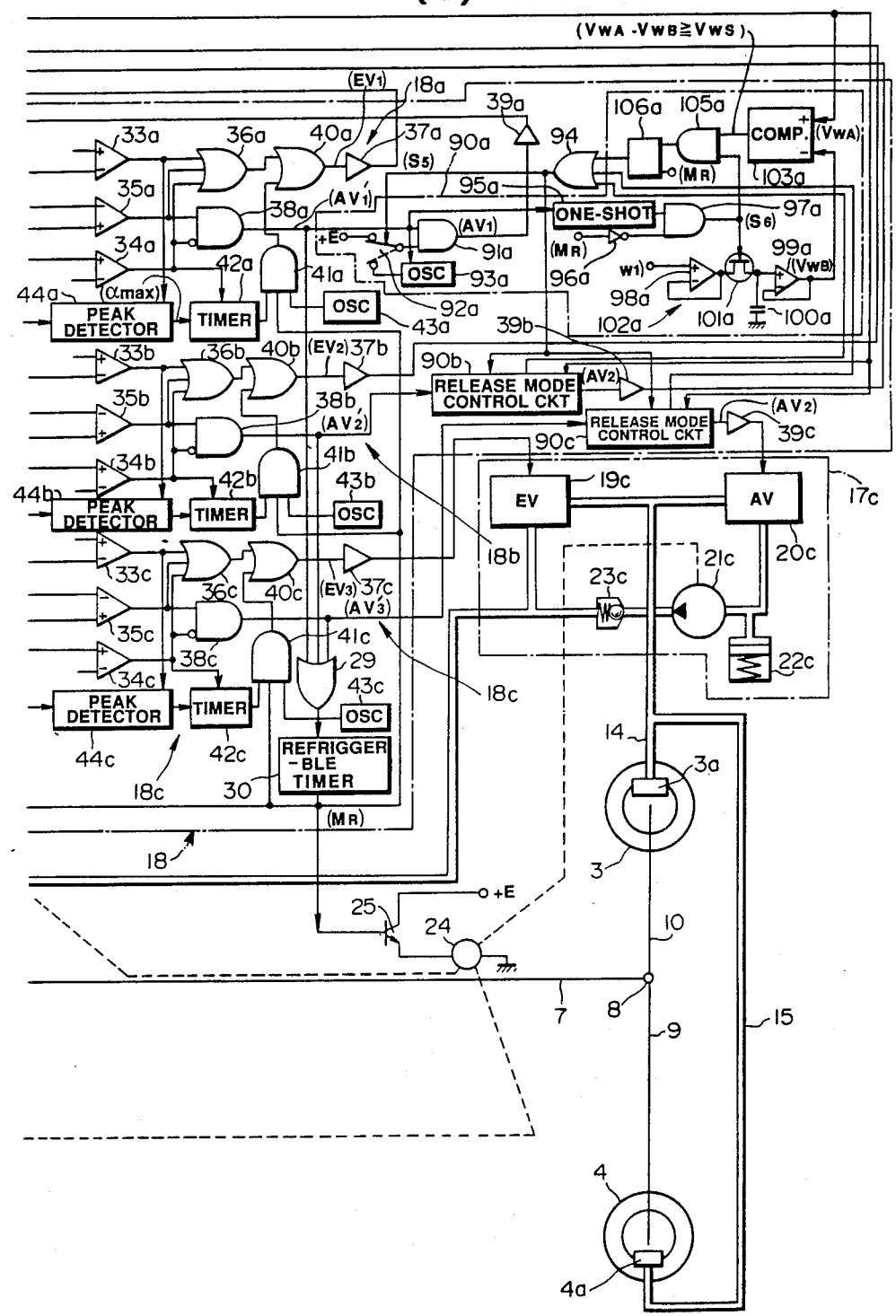

Referring now to the drawings, particularly to FIG. 1, a wheel slip control system is designed for controlling wheel slip at respective front-right, front-left, rear-right and rear-left wheels 1, 2, 3 and 4. Each of the front-right, front-left, rear-right and rear-left wheels 1, 2, 3 and 4 are co-operated with wheel cylinders 1a, 2a, 3a and 4a for to be applied braking force therethrough. On the other hand, the rear wheels 3 and 4 are connected to an automotive engine 5 through a power train constituted by a transmission 6, a propeller shaft 7, a differential gear unit 8 and drive shafts 9 and 10.

In the shown embodiment, the wheel slip control system controls braking force to be exerted to each wheel cylinders for performing anti-skid brake control for preventing the wheels from skidding. On the other hand, the wheel slip control system controls engine output torque or driving torque distribution to the driven rear wheels 3 and 4 so as to prevent the wheels from causing wheel-spin and to provide better tire/road traction. The engine output torque control or power distribution control may be performed by adjusting throttle valve angular position by means of a throttle valve servo systems, such as that disclosed in British Patent First Publications Nos. 2,154,763 and 2,154,765. The disclosure of the above-identified British Patent First Publications are herein incorporated by reference for the sake of disclosure. Furthermore, traction control systems for adjusting driving torque to be exerted on the driven wheels of the vehicle have been disclosed in the co-pending U.S. patent application Ser. No. 903,474, filed on Sept. 4, 1986, assigned to the common assignee to the present invention. The disclose of the above-identified co-pending U.S. Patent Application is also herein incorporated by reference for the sake of disclosure. Also, the following U.S. Patents disclose the relevant technologies closely related to the context of the present invention. The disclosure of the below listed U.S. Patents are also herein incorporated by reference for the sake of disclosure.

U.S. Pat. No. 4,662,686, issued on May 5, 1987
U.S. Pat. No. 4,667,176, issued on May 19, 1987
U.S. Pat. No. 4,597,052, issued on Jun. 24, 1986
U.S. Pat. No. 4,637,663, issued on Jan. 20, 1987
U.S. Pat. No. 4,683,537, issued on Jul. 28, 1987
U.S. Pat. No. 4,408,290, issued on Oct. 4, 1983
U.S. Pat. No. 4,674,049, issued on Jun. 16, 1987
U.S. Pat. No. 4,704,684, issued on Nov. 3, 1987
U.S. Pat. No. 4,663,715, issued on May 5, 1987
U.S. Pat. No. 4,663,716, issued on May 5, 1987
U.S. Pat. No. 4,660,146, issued on Apr. 21, 1987
U.S. Pat. No. 4,665,491, issued on May 12, 1987
U.S. Pat. No. 4,780,818, issued on Oct. 25, 1988
U.S. Pat. No. 4,674,050, issued on Jun. 16, 1987
U.S. Pat. No. 4,680,714, issued on Jul. 14, 1987
U.S. Pat. No. 4,682,295, issued on Jul. 21, 1987
U.S. Pat. No. 4,680,713, issued on Jul. 14, 1987
U.S. Pat. No. 4,669,046, issued on May 26, 1987
U.S. Pat. No. 4,669,045, issued on May 26, 1987
U.S. Pat. No. 4,679,146, issued on Jul. 7, 1987
U.S. Pat. No. 4,656,588, issued on Apr. 7, 1987
U.S. Pat. No. 4,718,013, issued on Jan. 5, 1988
U.S. Pat. No. 4,569,560, issued on Feb. 11, 1986

In the shown embodiment, a hydraulic brake system for applying braking fluid pressure to respective wheel cylinders 1a, 2a, 3a and 4a includes separated two hydraulic circuits 12 and 14. One of the hydraulic circuit 12 connects one of outlet ports of a master cylinder 11 to front-right wheel cylinder 1a which is associated with the front-right wheel 1. The hydraulic circuit 12 includes a branch circuit 13 connecting the one of the outlet port of the master cylinder 11 to the front-left wheel cylinder 2a of the front-left wheel 2. The other outlet port of the master cylinder 11 is connected to the rear-right wheel cylinder 3a and, through a branch circuit 15, to the rear-right wheel cylinder 4a. As is well known, the master cylinder 11 is mechanically coupled with a brake pedal 16 for building-up braking fluid pressure depending upon magnitude of depression of the brake pedal. The braking fluid pressure built up in the master cylinder 11 is distributed to respective wheel cylinders 1a, 2a, 3a and 4a through the circuits 12, 13, 14 and 15 for exerting braking force to respectively associated wheels 1, 2, 3 and 4.

Anti-skid brake control valves assemblies 17a and 17b and 17c are disposed in the circuits 12, 13 and 14. As will be seen from FIG. 1(A) and 1(B), the anti-skid brake control valve assembly 17c is positioned upstream of the junction between the circuits 14 and 15. Therefore, braking fluid pressure to be exerted to the rear wheel cylinders 3a and 4a is commonly controlled by means of the anti-skid brake control valve assembly 17c. On the other hand, the anti-skid brake control valves 17a and 17b are respectively disposed in the circuits 12 and 13 at the positions downstream of the junction of the circuits 12 and 13. Therefore, the valves 17a and 17b controls braking fluid pressures at associated one of the wheel cylinders 1a and 2a, independently of each other.

The anti-skid brake control valve assemblies 17a, 17b and 17c have mutually identical constructions to each other. Therefore, it would not be necessary to give detailed description of the constructions for the valve assemblies 17a, 17b and 17c, respectively. In order to avoid redundant recitation and avoiding confusion in understanding the invention, the construction of the anti-skid brake control valve assembly 17a will only be described herebelow. The constructions of the valve assemblies 17b and 17c should be understood as identical to that of the valve assembly 17a set out below.

The anti-skid brake control valve assembly 17a includes an inlet (EV) valve 19a, outlet (AV) valve 20a, a fluid pump 21a, accumulator 22a and one-way check valve 23a. The inlet valve 19a has an inlet port connected to the associated outlet port of the master cylinder 11 via the hydraulic circuit 12 and an oulet port connected to the front-right wheel cylinder 1a. On the other hand, the AV valve 20a has an inlet port connected to the wheel cylinder 1a and an outlet port connected to the accumulator 22a. The accumulator 22a is further connected to the hydraulic circuit 12 via the fluid pump 21a and the one-way check valve 23a for feeding back excessive fluid pressure therethrough. The fluid pump 23a is designed to draw the pressurized fluid in the associated wheel cylinder 1a to quickly reduce the braking pressure in the wheel cylinder while the anti-skid brake control is performed.

The EV valve 19a is controlled the valve position by an inlet control signal $EV_1$ from a control unit 18 between closed position and open position. Similarly, the AV valve 20a is controlled the valve position by an outlet control signal $AV_1$ from control unit 18 between closed position and open position. Furthermore, the fluid pump 21a is connected to the control unit 18 to receive a pump drive signal MR to be controlled its operation between driving condition and resting condition.

In the preferred embodiment, the EV valve 19a is in the open position while the inlet control signal $EV_1$ is LOW level. On the other hand, the AV valve 20a is in the closed position while the outlet control signal $AV_1$ is LOW level. The anti-skid brake control valve assembly 17a is operable in APPLICATION mode, RELEASE mode and HOLD mode. In the APPLICATION mode, the inlet control signal $EV_1$ is held LOW to maintain the EV valve 19a in open position. At the same time, the outlet control valve $AV_1$ is also held LOW to maintain the AV valve 20a in the closed position. Therefore, the oulet port of the master cylinder 11 is connected to the wheel cylinder 1a through the hydraulic circuit 12 and the EV valve 19a. Therefore, the braking fluid pressure in the wheel cylinder 1a increased proportionally to that built-up in the master cylinder. On the other hand, in the RELEASE mode, the inlet control signal $EV_1$ is switched into HIGH level to operate the EV valve 19a at the closed position. This shuts off the fluid communication between the outlet port of the master cylinder 11 and the wheel cylinder 1a therethrough. On the other hand, at this time, the outlet control signal $AV_1$ also becomes HIGH level to open the AV valve 20a. As a result, fluid communication between the wheel cylinder 1a and the accumulator 22a is established. At the same time, the pump drive signal MR turns into HIGH to drive the fluid pump 21. Therefore, the fluid pressure in the accumulator 22a becomes lower than that in the wheel cylinder 1a. Therefore, the braking fluid in the wheel cylinder 1a is drawn into the pressure accumulator.

On the other hand, in the HOLD mode, the inlet control signal $EV_1$ is set HIGH level to close the EV valve 19a and the outlet control signal $AV_1$ is set LOW level to maintain the AV valve 20a at closed position. Therefore, the wheel cylinder 1a is blocked fluid communication from the master cylinder 11 and the accumulator 22a. Therefore, the fluid pressure in the wheel cylinder 1a is held constant. The relationship of the inlet and outlet control signals $EV_1$ and $AV_1$ and the pump drive signal MR will be clearly seen from the following table:

TABLE

|  | APPLICATION | RELEASE | HOLD |
|---|---|---|---|
| $Ev_1$ | LOW | HIGH | HIGH |
| $AV_1$ | LOW | LOW | HIGH |
| MR | — | — | HIGH |

The control unit 18 is connected to a wheel speed sensor 26a for receiving pulse signal having frequency proportional to the rotation speed of the associated wheel 1. In practice, the wheel speed sensor 26 comprises a sensor rotor adapted to rotate with the vehicle wheel and a sensor assembly fixedly secured to the shim portion of the knuckle spindle. The sensor rotor is fixedly secured to a wheel hub for rotation with the vehicle wheel. The sensor rotor may be formed with a plurality of sensor teeth at regular angular intervals. The width of the teeth and the grooves therebetween are preferably equal to each other and define a unit angle of wheel rotation. The sensor assembly comprises a magnetic core aligned with north pole near the sensor rotor and south pole distal from the sensor rotor. A metal element with a smaller diameter section is attached to the end of the magnetic core near the sensor rotor. The free end of the metal element faces the sensor teeth. An electromagnetic coil encircles the smaller diameter section of the metal element. The electromagnetic coil is adapted to detect variation in the magnetic field generated by the magnetic core to produce an alternating-current sensor signal. Namely, the metal element and the magnetic core form a kind of proximity switch which adjusts the magnitude of the magnetic field depending upon the distance between the free and of the metal element and the sensor rotor surface. Thus, the intensity of the magnetic field fluctuates in relation to the passage of the sensor teeth and accordingly in relation to the angular velocity of the wheel.

Such wheel speed sensor has been disclosed in U.S. Pat. No. 4,597,052, issued on Jun. 24, 1986, for example.

The disclosure of the U.S. Pat. No. 4,597,052 is herein incorporated by reference for the sake of disclosure.

The control unit 18 has a controller channel 18a for performing wheel slip control for the right-front wheel 1. Similarly, the control unit 18 has controller channels 18b and 18c respectively adapted to perform wheel slip control for respectively associated left-front wheel 2 and rear wheels 3 and 4. The controller channel 18a receives the wheel speed indicative pulse signal from the wheel speed sensor 26a. Similarly, the controller channel 18b receives a wheel speed indicative pulse signal from a wheel speed sensor 26b which monitors rotation speed of the left-front wheel 2. A wheel speed sensor 26c is connected to the controller channel 18c for inputting wheel speed indicative pulse signal, which monitors average rotation speed of the rear wheels 3 and 4. In order to monitor the average speed of the rear wheels, the wheel speed sensor 26c is coupled with the propeller shaft 7 for monitoring rotation speed thereof as the average rotation speed of the rear wheels. As the anti-skid brake control valves 17a, 17b and 17c, the controller channels 18a, 18b and 18c are essentially the identical circuit constructions to each other. Therefore, the following discussion will be given only for the controller channel 18a. The corresponding elements in the controller channels 18b and 18c are represented by the same reference numerals with different suffixes which identifies the section to include the circuit elements.

As will be seen from FIG. 1, the controller channel 18a includes a wheel speed derivation circuit 31a and a wheel acceleratioin derivation circuit 32a. The wheel speed derivation circuit 31a receives the wheel speed indicative pulse signal or alternating current form frequency signal from the wheel speed sensor 26a. Based on the frequency or pulse period of the wheel speed indicative pulse signal or alternating current signal of the wheel speed sensor 26a and rotation radius of the right-front wheel, the wheel speed derivation ciruit 31a derives an angular velocity of the right-front wheel and whereby derives an instantaneous wheel speed $Vw_1$ of the right-front wheel 1.

Figure 2:
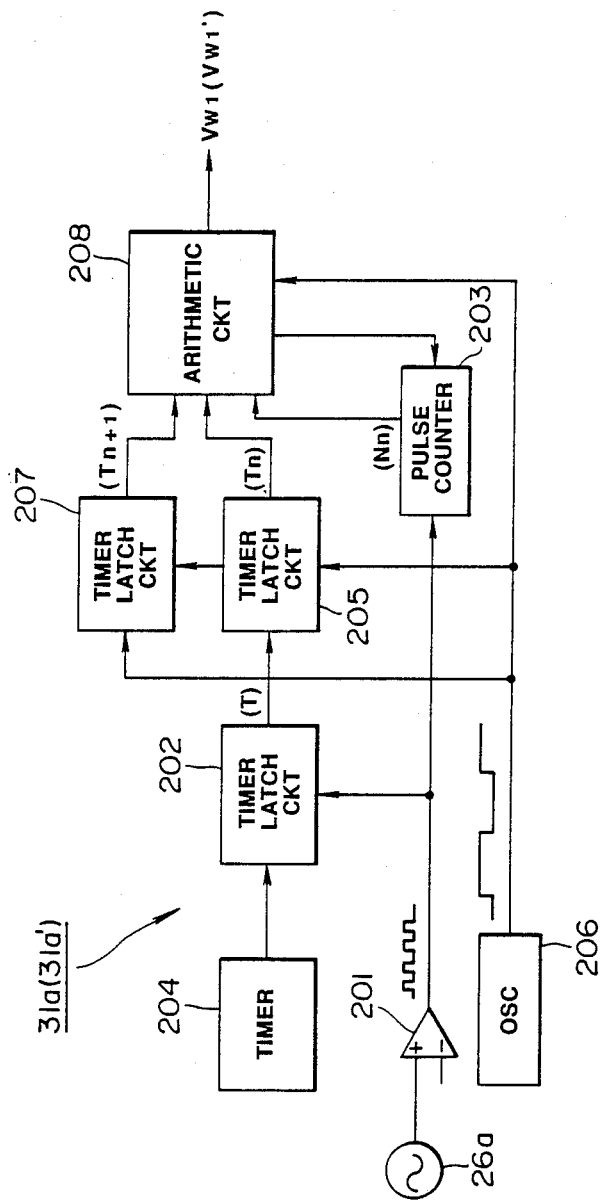
FIG. 2 is a block diagram of a wheel speed derivation circuit employed in the preferred embodiment of the anti-skid brake control system of FIG. 1.
Figure 3:
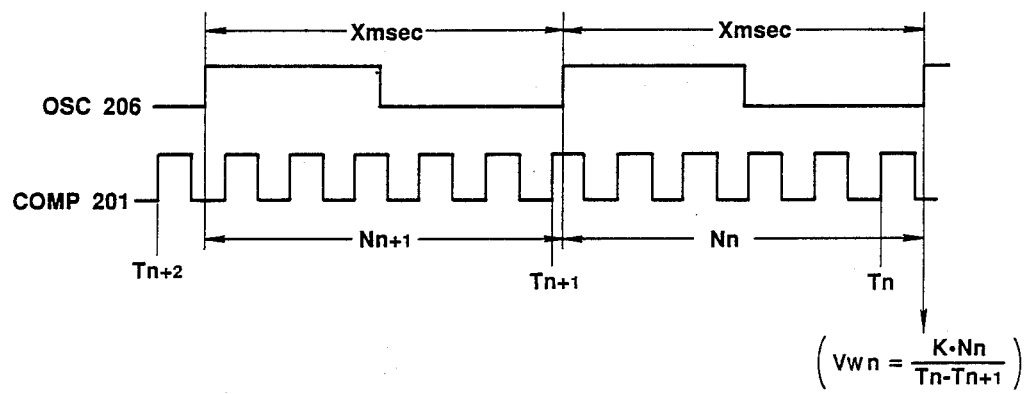
FIG. 3 is a timing chart showing waveforms of signals generated in the wheel speed derivation circuit of FIG. 2.

In the shown embodiment, the wheel speed derivation circuits 31a is constructed as illustrated in FIG. 2. As can be seen from FIG. 2, the wheel speed derivation circuit 31a comprises a comparator 201 which is connected to the wheel speed sensor 26a at the non-inverting input terminal to receive the alternating current form frequency signal. The inverting input terminal of the comparator 201 is connected to a reference level source to compare the frequency signal level with the reference level so as to produce a rectangular pulse train having the frequency corresponding to the alternating current form frequency signal. The output terminal of the comparator 201 is connected to a pulse counter 203 to feed the rectangular pulse train. The pulse counter 203 counts up the pulses in the pulse train fed from the comparator 201 to output a pulse counter value Nn indicative of the counted value.

The wheel speed derivation circuit 31a or 31a ' also has a timer latch circuit 202 which also receives the pulse train ouput from the comparator 201. The timer latch circuit 202 is also connected to a timer 204 to receive a timing data T from the latter. The timer latch circuit 202 is responsive to the leading edge of the HIGH level pulse to latch the instantaneous timing data input from the timer 204. The timer latch circuit 202 is also connected to another timer latch circuit 205 to feed the latched timing data. The timer latch circuit 205 is also connected to an oscillator 206 to receive therefrom a rectangular pulse having a predetermined frequency. As seen from FIG. 2, the pulse of the rectangular pulse generated by the oscullator 206 is set to be much longer than the pulse width of the wheel speed indicative pulse train output from the comparator 201. The timer latch circuit 205 is triggered by the leading edge of the HIGH level rectangular pulse from the oscillator 206 to latch the timing data T fed from the timer latch circuit 202 as a current timing data Tn. As will be appreciated, the current timing data Tn is thus updated with an interval corresponding to the pulse period of the rectangular pulse fed from the oscullator 206. Simultaneously to latching the timing data from the timer latch circuit 202, the timer latch circuit 205 tranfers the timing data Tn latched at the immediately preceding latching timing, i.e. the timing of occurrence of the leading edge of the immediately preceding HIGH level pulse, to a timer latch circuit 207 as an immediately preceding timing data Tn+1.

The timer latching circuits 205 and 207 are connected to an arithmetic circuit 208 to feed the current timing data Tn and immediately preceding timing data Tn+1. Also, the pulse counter 203 is connected to the arithmetic circuit 208 to feed the pulse counter value Nn. The arithmetic circuit 208 is also connected to the oscillator 206 to received therefrom the rectangular pulse. The arithmetic circuit 208 is triggered by the leading edge of the rectangular pulse to perform arithmetic operation for deriving wheel speed data $Vw_n$ according to the following equation:

$$Vw_n = (K \times Nn)/(Tn - Tn+1)$$

where K is constant

At a timing of completion of derivation of the wheel speed data $Vw_n$, the arithmetic circuit 208 feeds a reset signal to the pulse counter 203 to reset the latter.

It should be appreciated that the constant K is variable depending upon the radius of the wheel.

Derivation of the wheel acceleration $\alpha w_1$ based on the variation of wheel speed $Vw_1$ indicated in the wheel speed signal, can be performed by differentiating the differences of the wheel speeds input at different and consecutive timing. Otherwise, the wheel acceleration may be derived directly from the wheel speed indicative pulse signal from the wheel speed sensor 26a in a manner disclosed in the aforementioned U.S. Pat. No. 4,597,052.

Figure 4:
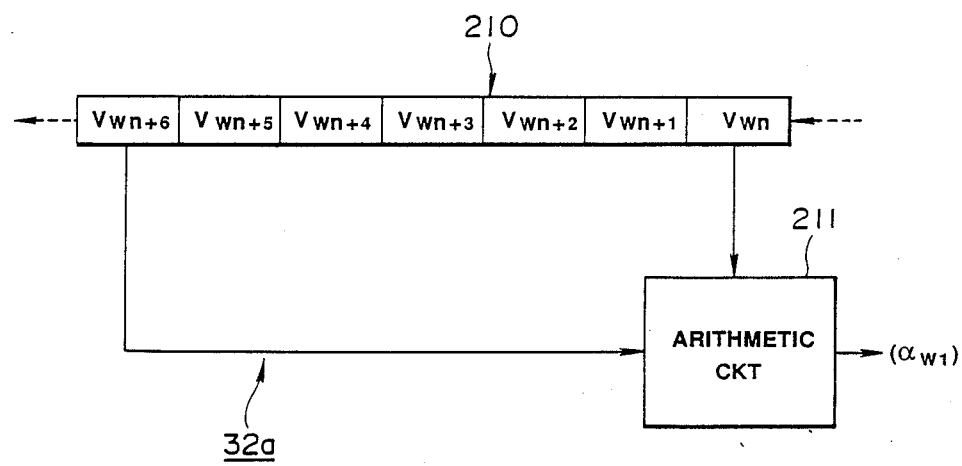
FIG. 4 is a block diagram of wheel acceleration derivation circuit employed in the preferred embodiment of the anti-skid control system of FIG. 1.

FIG. 4 shows practical construction of the wheel acceleration derivation circuit 32a. The wheel acceleration derivation circuit 32a has a shift register 210 having six memory blocks for temporarily storing the wheel speed data Vw and shifting the stored data in order. In the shift register 210, six wheel speed data including the current wheel speed data $Vw_n$ and the six cycle preceding wheel speed data $Vw_{n+6}$. The wheel acceleration derivation circuit 32a also includes an arithmetic circuit 211 to derive a difference between the current wheel speed data $Vw_n$ and the six cycle preceding wheel speed data $Vw_{n+6}$ and the known period (X msec×6:10 msec×6=60 msec). As shown in FIG. 1, the wheel acceleration indicative signal of the wheel acceleration derivation circuit 32a is tranmitted to a comparators 33a and 34a. In order to receive the wheel acceleration indicative signal, the comparator 33a is connected to the wheel acceleration derivation circuit 32a at an inverting input terminal. On the other hand, the comparator 34a is connected to the wheel acceleration derivation circuit 32a at a non-inverting input terminal thereof for receiving the wheel acceleration indicative signal therethrough. The wheel acceleration derivation circuit 32a is connected to a peak detector circuit 44a which is designed for detecting a peak value of the wheel acceleration $\alpha w_1$ and holds the peak value.

The non-inverting input terminal of the comparator 33a is connected to a reference signal generator (not shown) for receiving therefrom a deceleration threshold indicative reference signal −b. The deceleration threshold indicative reference signal has a value representative of a predetermined deceleration threshold to be compared with the wheel acceleration value $\alpha w_1$. The comparator 33a normally outputs a LOW level comparator signal as long as the wheel acceleration $\alpha w_1$ is maintained higher than the deceleration threshold −b. The comparator 33a is responsive to the wheel acceleration $\alpha w_1$ dropping across the deceleration threshold −b to output a HIGH level comparator signal.

The inverting input terminal of the comparator 34a is connected to a reference signal generator (not shown) which generates an acceleration threshold indicative reference signal having a value indicative of a predetermined wheel acceleration threshold +a. The comparator 34a thus compares the wheel acceleration $\alpha w_1$ as indicated in the wheel acceleration indicative signal of the wheel acceleration derivation circuit 32a with the wheel acceleration threshold +a. The comparator 34a generally outputs a LOW level comparator signal while the wheel acceleration $\alpha w_1$ is held lower than the wheel acceleration threshold +a. The comparator 34a produces a HIGH level comparator signal when the wheel acceleration $\alpha w_1$ rises across the wheel acceleration threshold.

Another comparator 35a is provided in the controller channel 18a. The comparator 35a has an inverting input terminal connected the wheel speed derivation circuit 31a for receiving therefrom the wheel speed signal. The comparator 35a also has a non-inverting input terminal connected to a target wheel speed derivation circuit 28a. The target wheel speed derivation circuit 28a generally derives a target wheel speed Vλ on the basis of a vehicle speed representing value Vi and a desired optimum wheel slippage for optimizing vehicular braking efficiency. As is well known, the vehicular braking efficiency becomes maximum in a wheel slippage range of 10% to 20%. In the practical embodiment, the target wheel slippage λ is set at 15%. On the other hand, the vehicle speed representing value Vi is derived on the basis of an instantaneous wheel speed Vw at the beginning of each cycle of anti-skid brake control. The procedure of derivation of the vehicular speed representing value Vi discussed later. The target wheel speed Vλ is derived at a value of 85% of the vehicle speed representing value Vi to indicate 15% of wheel slippage. The comparator 35a maintains a LOW level comparator signal while the wheel speed Vw is maintained higher than the target wheel speed Vλ. On the other hand, the comparator signal level of the comparator 35a turns HIGH when the wheel speed Vw drops across the target wheel speed Vλ.

The comparator signals of the comparators 33a and 34a and 35a are fed to input terminals of an OR gate 36. The comparator 34a and 35a are also connected to an AND gate 38 to feed the comparator signals. The AND gate 38a has an inverting input terminal connected to the comparator 35a to receive therefrom the comparator signal. The comparator 35a is further connected to a variable timer circuit 42a which will be described later.

The output terminal of the OR gate 36a is connected to one input terminal of an OR gate 40a. The other input terminal of the OR gate 40a is connected to an AND gate 41a. The AND gate 41a has one input terminal connected to the variable timer 42a. Another input terminal of the AND gate 41a is connected to the output terminal or an OR gate 90a. The OR gate 90a has one input terminal connected to a timer 91a of a synchronous locking detector circuit, which timer 91a serves as delay circuit for providing delay to operate the anti-skid brake control valve 17a into the APPLICATION mode. Operation of the timer 91 and the associated circuit thereof will be described in detail later. The other input terminal of the OR gate 90a is connected to an oscillator 43a which serves as a clock generator. The other input terminal of the AND gate 41a is connected to a retriggerable timer circuit 30 which is designed for producing a pump drive signal MR for driving the fluid pump 21a, 21b and 21c by applying the pump drive signal MR to pump drive motor 24 through a switching transistor 25.

A vehicle speed representing value derivation circuit 27a is connected to the wheel speed derivation circuit 31a to receive therefrom the wheel speed signal from time-to-time. The vehicle speed representing value derivation circuit 27a is also connected to the retriggerable timer circuit 30. The vehicle speed representing value derivation circuit 27a is designed to latch an instantaneous wheel speed Vw as an initial vehicle speed representing value $Vi_1$ in response to the leading edge of a HIGH level timer signal serving as the pump drive signal MR. The vehicle speed representing value derivation circuit 27a derives the vehicle speed representing value $Vi_1$ on the basis of the initial vehicle speed representing value corresponding to the latched wheel speed value $Vw_1$ as set forth above.

The vehicle speed representing value derivation circuit 27a is associated with other vehicle speed representing value derivation circuits 27b and 27c which derive the vehicle speed representing values $Vi_2$ and $Vi_3$ with respect to respectively associated left-front wheel 2 and rear wheel 3 and 4, in order to form the preferred embodiment of a vehicle speed representing value derivation system 27. The vehicle speed representing value derivation system 27 also includes a select-HIGH switch 58 having three terminals respectively connected to the vehicle speed representative value derivation circuits 27a, 27b and 27c. The select-HIGH switch 58 selects the greatest value among three vehicle speed representing values, $Vi_1$, $Vi_2$ and $Vi_2$ from respective vehicle speed representing value derivation circuits 27a, 27b and 27c and outputs the selected value as a common vehicle speed representing value Vi. The common vehicle speed representing value Vi is transferred to respective target wheel speed derivation circuits 28a, 28b and 28c in the controller channels 18a, 18b and 18c so that the target wheel derivation circuits will be able to derive the target wheel speeds $V\lambda_1$, $V\lambda_2$ and $V\lambda_3$ based thereon.

In the preferred embodiment, the control channel 18a, 18b and 18c respectively include RELEASE mode control circuits 90a, 90b and 90c for controlling RELEASE mode operation. Since these RELEASE mode control circuits 90a, 90b and 90c are constructed into identical constructions to each other, the detailed discussed given herein below will be concentrated to the RELEASE mode control circuit 90a of the control channel 18a.

The RELEASE mode control circuit 90a includes an AND gate 91a which has an input terminal connected to the AND gate 38a to receive therefrom the gate signal output therefrom. The AND gate 91a has another input terminal connected to a switch 92a. The switch 92a is responsive to LOW level RELEASE mode control signal $S_5$ to supply HIGH level signal from a power source $+E$. On the other hand, the switch 92a is responsive to the RELEASE mode control signal $S_5$ to output a constant period pulse from a pulse generator (OSC) 93a. Accordingly, the AND gate 91a outputs gate signal having signal level corresponding to the signal level of the gate signal of the AND gate 38a as the outlet control signal $AV_1$ while the RELEASE mode control signal $S_5$ is maintained LOW level. By this, the braking pressure in the wheel cylinder 1a is abruptly and linearly decreased. On the other hand, while the RELEASE mode control signal $S_5$ is maintained HIGH level, the pulse signal of the pulse generator 93a is output as the outlet control signal $AV_1$. Therefore, the braking pressure in the wheel cylinder 1a is moderately decreased in stepwise fashion. In the following discussion, the RELEASE mode operation for abruptly and linearly decreasing the braking pressure will be referred to as "normal RELEASE mode" and for moderately and stepwise decreasing the braking pressure will be referred to as "controlled RELEASE mode".

The RELEASE mode control signal $S_5$ is generated by an OR gate 94. In order to determine the gate signal level of the OR gate 94 as the RELEASE mode control signal, a shot pulse generator circuit 95a, NOT gate 96a and AND gate 97a are provided. These shot pulse generator circuit 95a, NOT gate 96a and AND gate 97a form an anti-skid control initiation timing detecting circuit. The shot pulse generator circuit 95a is responsive to the leading edge of the HIGH level gate signal of the HIGH gate 38a to output a shot pulse. The AND gate 97a receives the pump driver signal MR of the retriggerable timer 31 via the NOT gate 96a. Therefore, the input for the AND gate 97a via the NOT gate 96 is inverted level of the pump drive signal MR. The AND gate 97a outputs shot pulse in response to the shot pulse of the shot pulse generator circuit 95a while the input level from the NOT gate 96a is maintianed at HIGH level. Namely, since the pump drive signal MR is maintained at HIGH level through out the period, in which anti-skid brake control is performed over a plurality of skid control cycle, the input level for the AND gate 97a via the NOT gate 96a is maintained HIGH level only when the anti-skid brake control is not initiated. Therefore, aforementioned shot pulse $S_6$ is output once at the timing of initiation of the anti-skid brake control.

A sample/hold circuit 102a is associated with the anti-skid control initiation timing detecting circuit. The sample/hold circuit 102a comprises a buffer amplifier 98a and 99a, a capacitor 100a and an analog switch 101a. The sample/hold circuit 102a is supplied the wheel speed indicative signal $Vw_1$ from the wheel speed derivation circuit 31a to sample the value of the wheel speed indicative signal. The sample/hold circuit 102a is responsive to the shot pulse $S_6$ from the AND gate 97a of the anti-skid brake control initiation timing detector circuit the hold the instantaneous value of the wheel speed indicative signal $Vw_1$. The instantaneous wheel speed indicative signal value upon occurrence of the shot pulse will be hereafter referred to as "initiation timing wheel speed indicative data $Vw_B$". The sample/-hold circuit 102a supplies the initial wheel speed indicative data thus held to a subtracting comparator circuit 103a.

The subtracting comparator circuit 103a has another input terminal connected to a wheel speed derivation circuit 104 for deriving a wheel speed indicative data upon initiation of braking control operation. The wheel speed derivation circuit 104 will be hereafter referred to as "initial wheel speed derivation circuit" and the wheel speed indicative data derived by the initial wheel speed derivation circuit will be hereafter referred to as "initial wheel speed indicative data $Vw_A$". The subtracting comparator circuit 103a derives a difference $\Delta Vw$ between the initial wheel speed indicative data $Vw_A$ and the initiation timing wheel speed indicative data $Vw_B$. The subtracting comparator 103a compares the difference $\Delta Vw$ with a predetermined threshold value $Vw_s$ to output HIGH level comparator signal when the difference $\Delta Vw$ is greater than the threshold value $Vw_s$ and to output LOW level comparator signal otherwise. The comparator signal of the substracting comparator circuit 103a is fed to an AND gate 105a. The AND gate 105a has another input terminal connected to the AND gate 97a to receive therefrom the shot pulse $S_6$. Therefore, when AND condition of the HIGH level comparator signal of the substrating comparator circuit 103a and the shot pulse is established, judgement is made that the road surface has higher friction than a predetermined friction criterion represented by the threshold value $Vw_s$. Then, the AND gate 105 a supplies HIGH level gate signal to a set input terminal of a flip-flop 106a for setting the later. Therefore the RELEASE mode control signal output from the OR gate 94 becomes HIGH level. On the other hand, on the other hand, when the difference $\Delta Vw$ is smaller than or equal to the threshold value $Vw_s$, the output level of the subtracting comparator circuit 103a becomes LOW level. Therefore, the flip-flop 106a is maintained at a reset state. Therefore, the RELEASE mode control signal $S_5$ is maintained at LOW level. The reset input terminal of the flip-flop 106a is connected to the retriggerable timer 30 to be reset in response to the trailing edge of the HIGH level pump drive signal MR.

Though it is neglected from the accompanying drawings for the purpose of simplification of drawings and disclosure, the preferred embodiment of the anti-skid brake control system, according to the present invention, may be adapted to prevent the front wheels, i.e. right-front wheel 1 and the left-front wheel 2 from synchronously locking. Therefore, the synchronous locking detector circuit is provided for detecting synchronous lock at right- and left front wheels 1 and 2. The synchronous lock detector circuit is thus associated with the controller channels 18a and 18b. The synchronous lock detector circuit includes counters. The counter is connected to the output terminal of the OR gate 40a at input terminal. The counter is triggered by LOW level gate signal from the OR gate 40a to count-up an internal clock for increasing the counter value thereof according to the length of period to maintain the anti-skid brake control valve 17a in APPLICATION mode. On the other hand, the counter is connected to a shot pulse generator to receive therefrom a rest pulse at its reset input terminal to clear the counter value in response to the reset pulse. The shot-pulse generator is, in turn, connected to the output terminal of the comparator 35a to be triggered by the trailing edge of the HIGH level comparator signal therefrom. Similarly, the counter is connected to the output terminal of the OR gate 40b at input terminal. The counter is triggered by LOW level gate signal from the OR gate 40b to count-up an internal clock for increasing the counter value thereof according to the length of period to maintain the anti-skid brake control valve 17b in APPLICATION mode. On the other hand, the counter is connected to a shot pulse generator to receive therefrom a rest pulse at its reset input terminal to clear the counter value in response to the reset pulse. The shot-pulse generator is, in turn, connected to the output terminal of the comparator 35b to be triggered by the trailing edge of the HIGH level comparator signal therefrom connected to the AND gates 41a and 41b.

The counter is connected to the non-inverting input terminal of a comparator and a subtracting circuit. The inverting input terminal of the comparator is connected to the peak hold circuit 44a through a ¾ multiplier 96a to receive a ¾ multiplied peak value indicative signal. Similarly, the counter is connected to the non-inverting input terminal of a comparator and a subtracting circuit. The inverting input terminal of the comparator is connected to the peak hold circuit 44a through a ¾ multiplier to receive a ¾ multiplied peak value indicative signal.

The output terminal of the comparator is connected to one input terminal of an AND gate. Another input terminal of the AND gate is connected to a wheel speed drop-rate detector circuit. The wheel speed drop-rate detector circuit is receives the comparators 34a and 35a to receive therefrom the comparator signals. The other input terminal of the AND gate is connected to the output terminal of a comparator which receives the output of the subtractor circuit at its inverting input terminal. A reference value signal is applied to the non-inverting input terminal of the comparator. The output terminal of the AND gate is connected to one input terminal of an AND gate. Another input terminal of the AND gate is connected to the output terminal of the timer via an inverter. The other input terminal of the AND gate is connected to the output terminal of an AND gate. The AND gate has an output terminal connected to the timer via an inverter.

The wheel speed drop-rate detector circuit is designed for detecting variation rate of the rotation speed of the right-front wheel 1 and compares the derived variation rate with a predetermined value to produce a HIGH level detector signal when the variation rate is smaller than or equal to the predetermined value.

The output terminal of the comparator is connected to one input terminal of an AND gate. Another input terminal of the AND gate is connected to a wheel speed drop-rate detector circuit. The wheel speed drop-rate detector circuit is receives the comparators 34b and 35b to receive therefrom the comparator signals. The other input terminal of the AND gate is connected to the output terminal of the comparator. The output terminal of the AND gate is connected to one input terminal of an AND gate. The other input terminal of the AND gate is connected to the output terminal of the timer via an inverter.

Figure 5:
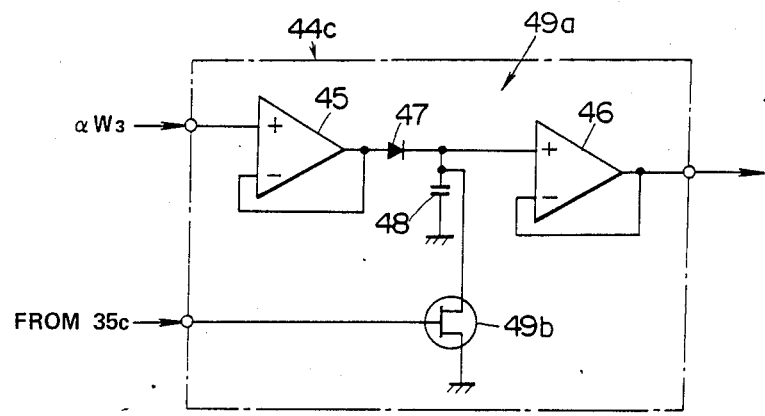
FIG. 5 is a circuit diagram of a peak detecting circuit in the wheel speed representing value derivation circuit of FIG. 1.

FIG. 5 shows detailed construction of the peak detector circuit 44a in the controller channel 18a set forth above. As will be seen from FIG. 5, the peak hold circuit 44a generally comprises a peak hold circuit 49a and an analog switch 49b. The peak hold circuit 48 is consisted of buffer amplifiers 45 and 46, a diode 47 and a capacitor 48. The buffer amplifier 45 of the peak hold circuit 49a is connected to the wheel acceleration derivation circuit 32a' to receive therefrom the wheel acceleration indicative signal having a value representative of the wheel acceleration $\alpha w_1'$, at a non-inverted input terminal. An inverting input terminal of the buffer amplifier 45 is connected to an output terminal thereof for receiving the amplifier output as feedback input. The buffer amplifier outputs through its output terminal the amplifier output indicative of one of the inputs greater than the other. The amplifier output of the buffer amplifier 45 is fed to a charge/discharge circuit consisted of the diode 47 and the capacitor 48 and to a non-inverted input terminal of the other buffer amplifier 46. Similarly to the aforementioned buffer amplifier 45, an inverting imput terminal of the buffer amplifier 46 is connected to an output terminal thereof to receive the amplifier output as feedback input.

Figure 6:
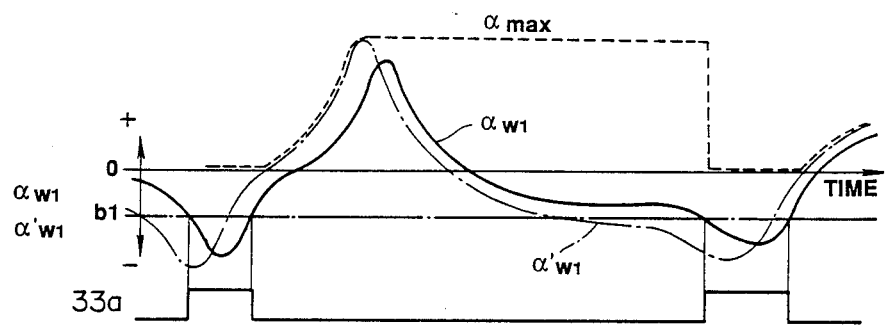
FIG. 6 is a chart showing manner of detection of the wheel speed peak to be carried out by the peak detecting circuit of FIG. 5.

The input side of the capacitor 48 is connected to the ground through the analog switch 49b. The analog switch 49b is connected to the comparator 33a. Therefore, the analog switch 49a becomes conductive at every leading edge of the HIGH level comparator signal from the comparator 33a for connecting the capacitor 48 to the ground. As a result, the potential in the capacitor 48 is discharged to the ground. Since the analog switch 49a is held conductive while the comparator signal from the comparator 33a is held at HIGH level, the potential in the capacitor 48 is maintained substantially zero during this period. The analog switch 49a becomes non-conductive in response to the trailing edge of the HIGH level comparator signal from the comparator 33a to block communication between the capacitor and the ground. As a result, the capacitor 48 start to be charged by the amplifier output from the buffer amplifier 45. The potential in the capacitor 48 is increased as increasing of the wheel acceleration $\alpha w_1$ and held at the value corresponding to the peak value of the wheel acceleration, as shown in FIG. 6. Therefore, the amplifier output from the buffer amplifier 46 indicates peak value $\alpha w_{max}$ of the wheel acceleration. As set forth above, since the potential in the capacitor 48 is discharged every time the comparator signal rises to HIGH, the peak value $\alpha w_{max}$ output from the peak detector circuit 44a represents the peak value of the wheel acceleration $\alpha w_1$ in each skid cycle, while the anti-skid brake control is performed.

Figure 7:
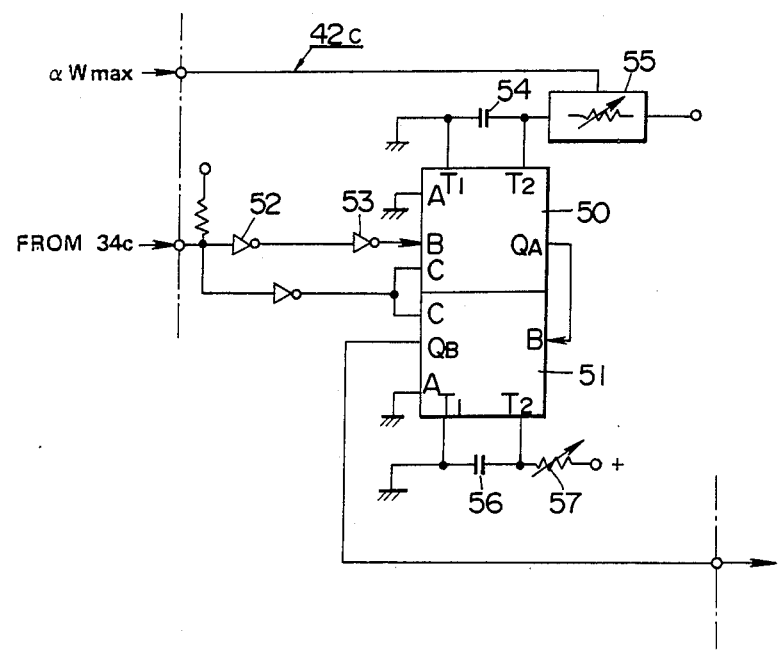
FIG. 7 is a circuit diagram of a variable timer circuit employer in the wheel slip control system of FIG. 1.

FIG. 7 shows a detailed construction of the variable timer 42a. The variable timer 42a generally comprises a first timer 51 and a second timer 52. The first timer 50 has an input port B connected to the output terminal of the comparator 34a through an inverter 52 to receive therefrom the inverted comparator signal. The first timer 50 is designed to be triggered in response to the trailing edge of the HIGH level input at the input port B to output timer signal $Q_A$ for a given period of time $T_1$. The period $T_1$ to maintain the timer signal $Q_A$ is determined by a time constant derived from a capacity of a capacitor 54 and a resistance of a variable resistor 55 connected to the terminals $T_1$ and $T_2$ of the first timer 50. The variable resistor 55 is connected to the aforementioned peak detector circuit 44a to receive therefrom the amplifier output as a wheel acceleration peak indicative input. The resistance of the variable resistor 55 is adjusted depending upon the peak value $\alpha w_{max}$ as indicated in the wheel acceleration peak indicative signal. Therefore, the timer period of the first timer 50 is variable in proportion to the magnitude of the peak value $\alpha w_{max}$.

Figure 8:
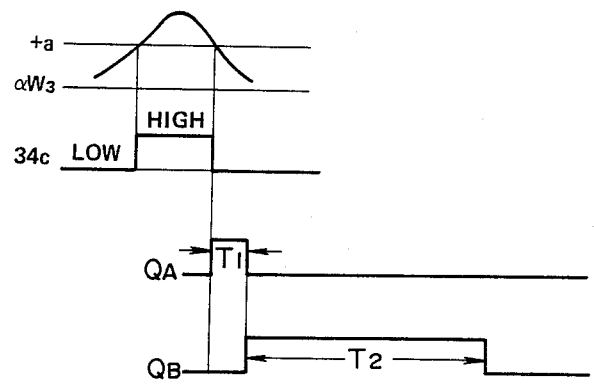
FIG. 8 is a chart showing operation of the variable timer circuit of FIG. 4.

The timer signal $Q_A$ of the first timer 50 is fed to a B input port of the second timer 51. The second timer 51 has a time constant circuit consisted of a capacitor 56 and a variable resistor 57 for providing a timer period $T_2$. The time constant of the time constant circuit of the capacitor 56 and the variable resistor 57 is set constant to set the timer period $T_2$ constant. Therefore, the second timer 51 is triggered by the trailing edge of the HIGH level input at the B input terminal. The second timer 51 as triggered outputs HIGH level timer signal for the timer period determined by the time constant of the time constant circuit of the capacitor 56 and the variable resistor 57, through $Q_B$ output terminal for the given period of time $T_2$, as shown in FIG. 8.

Figure 9:
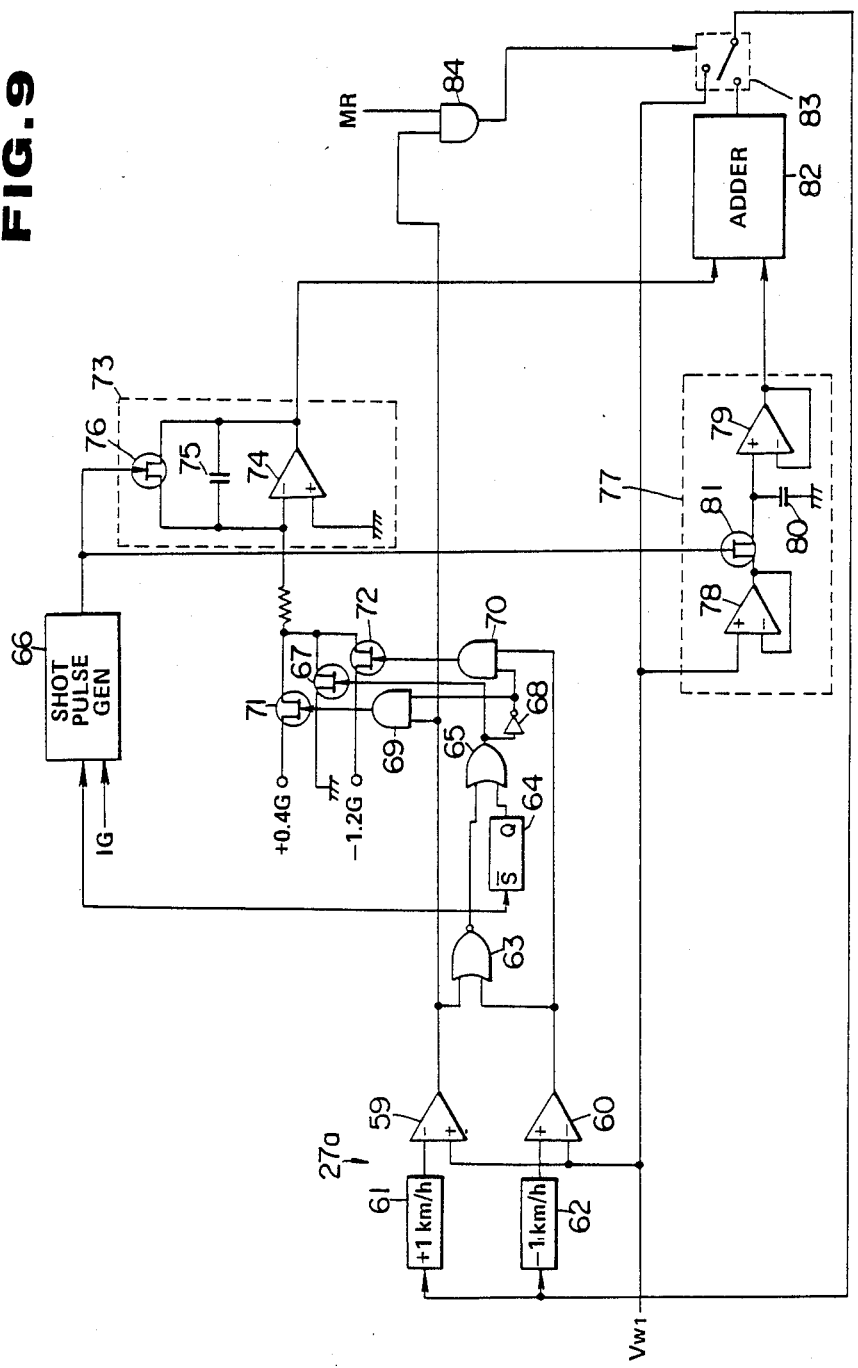
FIG. 9 is a block diagram of a wheel speed drop rate detecting cirucit in the preferred embodiment of the anti-skid brake control system of FIG. 1

FIG. 9 shows the detailed construction of the vehicle speed representing value derivation circuit 27a. As set forth above, the vehicle speed representing value derivation circuit 27a derives a vehicle speed representing value $Vi_1$ based on the wheel speed $Vw_1$ as indicated in the wheel speed signal from the wheel speed derivation circuit 31a. The vehicle speed representing value derivation circuit 27a includes comparators 59 and 60. The comparator 59 has a non-inverting input terminal connected to the wheel speed derivation circuit 31a. On the other hand, the comparator 60 is connected to the wheel speed derivation circuit 31a at an inverting input terminal. An inverting input terminal of the comparator 59 is connected to output terminal of the vehicle speed representing value derivation circuit 27a through which the vehicle speed representing value $Vi_1$ is output, through an adder 61. On the other hand, the non-inverting input terminal of the comparator 60 is connected to the output terminal of the vehicle speed representing value derivation circuit 27a through a subtractor 62. The adder 61 is designed to add a given value corresponding to 1 km/h of vehicle speed to the vehicle speed representing value $Vi_1$ for providing dead band of +1 km/h. The value as the sum of the vehicle speed representing value $Vi_1$ and the dead band value 1 km/h will be hereafter referred to as higher vehicle speed reference value. Similarly, the subtractor 62 subtracts a given value corresponding to 1 km/h of the vehicle speed from the vehicle speed representing value $Vi_1$ for providing dead band of −1 km/h. The value as the difference of the vehicle speed representing value $Vi_1$ and the dead band value −1 km/h will be hereafter referred to as lower vehicle speed reference value. The comparator 59 outputs HIGH level comparator signal when the wheel speed $vw_1$ is higher than or equal to the higher vehicle speed reference value ($Vi_1$ + 1 km/h). In other words, the comparator signal level of the comparator 59 is held LOW as long as the wheel speed $Vw_1$ is maintained lower than the lower vehicle speed reference value ($Vi_1$ + 1 km/h). The comparator 60 outputs HIGH level comparator signal when the wheel speed $vw_1$ is lower than to the lower vehicle speed reference value ($Vi_1$ − 1 km/h). In other words, the comparator signal level of the comparator 59 is held LOW as long as the wheel speed $Vw_1$ is maintained higher than or equal to the lower vehicle speed reference value ($Vi_1$ − 1 km/h).

The output terminals of the comparators 59 and 60 are connected to input terminals of NOR gate 63 to feed the comparator signals $c_1$ and $c_2$ thereto. The NOR gate 63 outputs HIGH level gate signal while signal levels of both of the comparator signals $c_1$ and $c_2$ are maintained LOW. Namely, the gate signal output from the NOR gate 63 is held LOW while the wheel speed $Vw_1$ is maintained higher than or equal to the vehicle speed representing value $Vi_1-1$ km/h and lower than the higher vehicle speed reference value ($Vi_1+1$ km/h). The gate signal of the NOR gate 63 is fed to a timer 64, an OR gate 65 and a shot-pulse generator 66, respectively. The timer 64 is responsive to the trailing edge of the HIGH level NOR gate signal to output a timer signal for a given period of time $T_3$, e.g. 0.1 sec. The timer signal is fed to the OR gate 65.

The OR gate 65 thus receives the NOR gate signal at one input terminal and the timer signal from the timer 64 at the other input terminal. An OR gate signal of the OR gate 65 is transmitted to a gate of an analog switch 67 as a selector signal $S_3$. The output terminal of the OR gate 65 is also connected to one input terminal of an AND gates 69 and 70 via an inverter 68. The other input terminal of the AND gate 69 is connected to the output terminal of the comparator 59 to receive therefrom the comparator signal $c_1$. Similarly, the other input terminal of the AND gate 70 is connected to the output terminal of the comparator 60 to receive the comparator signal $c_2$ therefrom. Therefore, the gate signal $S_2$ of the AND gate 69 becomes HIGH while the comparator signal $c_1$ is maintained at HIGH level and the NOR gate signal is held LOW. The gate signal $S_2$ serves as a selector signal. On the other hand, the gate signal $S_4$ of the AND gate 70 becomes HIGH level while the comparator signal $c_2$ is maintained HIGH and the NOR gate signal is held LOW. This gate signal $S_4$ also serves as selector signal. The AND gates 69 and 70 are connected to gates of analog switches 71 and 72.

The analog switch 67 is turned ON in response to HIGH level selector signal $S_3$ to drop the supply voltage to an integrator circuit 73 to zero. On the other hand, the analog switch 71 is turned ON in response to the HIGH level selector signal $S_2$ to supply a voltage E corresponding to a possible maximum wheel acceleration, e.g. 0.4 G, to the integrator circuit 73. The analog switch 72 is likewise turned ON in response to the HIGH level selector signal $S_4$ to supply a voltage corresponding to possible minimum wheel acceleration value, e.g. $-1.2$ G, to the integrator circuit 73.

The integrator circuit 73 has a per se well known construction and is consisted of an amplifier 74, a capacitor 75 and an analog switch 76. The gate of the analog switch 76 is connected to the shot-pulse generator 66 to receive therefrom a shot-pulse which serves as a reset signal $S_1$. The integrator 73 is reset by the HIGH level reset signal $S_1$ and is responsive to the trailing edge of the HIGH level reset signal to reset the integrated value. The integrator circuit 73 integrates the supply voltage E after termination of the HIGH level reset signal $S_1$ to output the integrator signal. The shot-pulse generator 65 is responsive to an ON-set signal IG of an ignition switch to generate a first shot pulse as the first reset signal for resetting the integrator circuit 73. The shot-pulse generator 66 subsequently generate the shot-pulses serving as the reset signal $S_1$ at every leading edge of the HIGH level NOR gate signal. As set forth above, since the NOR gate signal becomes HIGH when the wheel speed $Vw_1$ satisfies ($Vi_1-1$ km/h) $\leq Vw_1 <$ ($Vi_1+1$ km/h), the integrated value of the integrator 73 is reset every occurrence of the wheel speed $Vw_1$ in the aforementioned range. The reset signal $S_1$ of the shot-pulse generator 66 is also supplied to a sample hold circuit 77. The sample hold circuit 77 comprises a buffer amplifiers 78 and 79, a capacitor 80 and an analog switch 81. The analog switch 81 is connected to the shot-pulse generator 66 to receive the reset signal $S_1$ at the gate thereof to be turned ON. The sample hold circuit 77 is responsive to turning ON of the analog switch 81 to reset the held wheel speed value. The sample hold circuit 77 in absence of the reset signal $S_1$ from the shot-pulse generator 66, samples and holds the instantaneous wheel speed value $Vw_1$ at the occurrence of the reset signal as a sample value Vs. The sample hold circuit 77 outputs a sample/hold signal having a value indicative of the sample value Vs to an adder 82. The adder receives the sample/hold signal from the sample hold circuit 77 and integrator signal from the integrator 73. As will be appreciated, the integrator signal has a value indicative of an integrated value $$Ve\left( = \int_0^t (-E) \cdot dt \right).$$

Therefore, the adder 82 adds the integrated value Ve to the sample value Vs to derive the vehicle speed representing value $Vi_1$. The output terminal of the adder 82 is connected to a switching circuit 83. The switching circuit 83 is also directly connected to the wheel speed derivation circuit 31a to be input the wheel speed signal. On the other hand, the switching circuit 83 also connected to an AND gate 84. The AND gate 84 has one input terminal connected to a retriggerable timer 30 to receive therefrom the pump drive signal MR. The other input terminal of the AND gate 84 is connected to the output terminal of the comparator 59. The AND gate 84 controls the switch position of the switching circuit 83 to selectively connect the wheel speed derivation circuit 31a or the adder 82 to the output terminal of the vehicle speed representing value derivation circuit 27a.

Namely, the gate signal of the AND gate is normally maintained LOW level due to absence of the HIGH level pump drive signal MR. The gate signal of the AND gate is also held LOW level while the wheel acceleration is negative or that the wheel speed $Vw_1$ is lower than the $Vi_1+1$ km/h value as compared in the comparator 59. While the gate signal is held LOW, the switching circuit 82 is held at a first switch position where the adder 82 is connected to the output terminal of the vehicle speed representing value derivation circuit therethrough. On the other hand, when the HIGH level pump drive signal MR and the HIGH level comparator signal of the comparator 59 are both input to the AND gate, the gate signal of the AND gate 84 turns HIGH to switch the switching circuit 83 to a second switch position where the wheel speed derivation circuit 31a is directly connected to the output terminal of the vehicle speed representing value derivation circuit 27a.

The select-HIGH switch 58 is connected to one terminal of a select-HIGH switch 87 which has a switching element connected to the target wheel speed derivation circuit 28a. The select-HIGH switch 87 is also connected to a vehicle speed representative value correction circuit 86 which modifies the vehicle speed representative value to output a modified vehicle speed representative value Vr.

Figure 10:
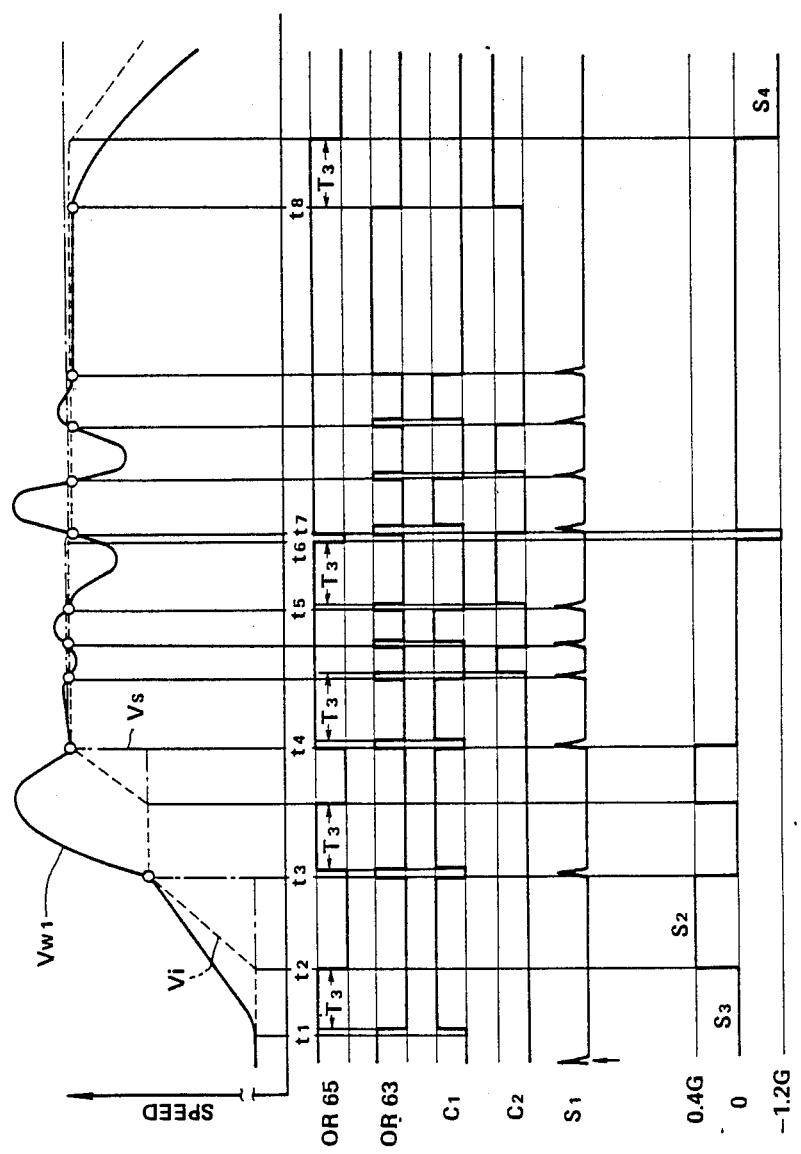
FIG. 10 is a timing chart showing operation of the wheel speed drop rate detecting circuit of FIG. 9

Operation of the vehicle speed representing derivation circuit 27a will be described herebelow with reference to FIG. 10. In FIG. 10, the operations of the vehicle speed representing value derivation circuit 27a will be described in a condition where the gate signal level of the AND gate 84 is maintained LOW level due to absence of the HIGH level pump signal MR or the comparator signal $c_1$ from the comparator 59 is held LOW. At this condition, by the LOW level gate signal of the AND gate 84, the switching circuit 83 is switched at a switch position where the adder 82 is connected to the output terminal of the vehicle speed representing value derivation circuit.

In the process of FIG. 10, the engine is started up at a time $t_0$. In response thereto, the ON-set signal IG is input to the shot-pulse generator 66. Therefore, the shot pulse $s_1$ is output at the time $t_0$ from the shot-pulse generator 66. With the shot pulse at the time $t_0$, the sample hold circuit 77 is reset. The sample/hold circuit 77 as reset by the shot pulse $s_1$ at the time $t_0$, samples and holds the wheel speed signal value $Vw_1$ as sample value Vs. Therefore, after the time $t_0$, the held sample value Vs is output from the sample hold circuit 77 as an initial vehicle speed representing value. At the same time, i.e. at the time $t_0$, the integrator circuit 73 is reset by the reset signal $s_1$. Therefore, the value Ve of the integrator signal of the integrator circuit 73 drops to zero. As a result, the output value $Vi_1$ from the adder 82 becomes that equal to the held initial vehicle speed representing value Vi, as shown by broken line in FIG. 10.

At this time, the comparator signals $c_1$ and $c_2$ of the comparators 59 and 60 are maintained LOW level. Therefore, the NOR gate signal of the NOR gate 63 is maintained HIGH level. Therefore, the gate signal level of the OR gate 65 is maintained HIGH level and the gate signal is fed to the analog switch 67 as the select signal $S_3$. Therefore, the analog switch 67 is turned ON by the HIGH level gate signal from the OR gate 65. On the other hand, the HIGH level gate signal of the OR gate 65 is fed to the AND gates 69 and 70 through the inverter 68. Therefore, the select signals $S_2$ and $S_4$ of the AND gates 69 and 70 are held LOW to maintain the analog switches 71 and 72 at OFF position. Since the analog switch 67 serves to maintain the input level at the inverting input terminal of the comparator 74 in the integrator circuit 73 zero, the integrated value of the integrator circuit 73 is maintained zero. As a consequence, the output value of the adder 82 as the vehicle speed representing value Vi is maintained at the equal value to the initial vehicle speed representing value as the sample value Vs.

After the vehicle start running, the wheel speed Vw becomes greater than or equal to $Vi_1 + 1$ km/h, at a time $t_1$. In response to this, the comparator signal of the comparator 59 turns HIGH level. By the HIGH level comparator signal $c_1$ from the comparator 59, the gate signal of the NOR gate 63 turns LOW. At this time, since the timer 64 becomes active to output HIGH level timer signal for a period of time $T_3$, the gate signal level of the OR gate 65 is maintained HIGH level for the corresponding $T_3$ period. Therefore, the select signal $S_3$ is maintained HIGH level and the selector signals $S_2$ and $S_4$ are held at LOW level. Therefore, even after the vehicle start running the vehicle speed representing value $Vi_1$ is held at the equal value to the sample value Vs for the $T_3$ period.

After expiration of the $T_3$ period, at a time $t_2$, the gate signal of the OR gate 65 turned into LOW level due to termination of the HIGH level timer signal from the timer 64. Since the comparator signal $c_1$ and the inverted gate signal from the OR gate 65 through the inverter 68 are both becomes HIGH level, the selector signal $S_2$ of the AND gate 69 turns HIGH. At the same time, because of LOW level gate signal of the OR gate 65 is applied to the gate of the analog switch 67 as the select signal $S_3$ to turn the latter OFF. At this time, since the comparator signal from the comparator 60 is maintained LOW level, the AND gate 70 is maintained non-conductive to feed the LOW level select signal $S_4$. Therefore, only analog switch 71 is turned ON to input a value corresponding to wheel acceleration magnitude of 0.4 G. This value, e.g. 0.4 G serves for defining inclination of the vehicle speed representing value $Vi_1$. The integrator circuit 73 thus receives the value (0.4 G) through the analog switch 71 to output the integrator signal having a value Ve as set forth above. Therefore, the output value of the adder 82 increases from time-to-time as increasing of the integrator signal value Ve.

At a time $t_3$, the vehicle speed representing value $Vi_1$ ($=Vs+Ve$) reaches a value to establish $Vw_1 < Vi_1 + 1$ km/h. Then, the comparator signal $c_1$ turns into LOW level. Therefore, the gate signal level of the NOR gate 63 again turns into HIGH level. The shot-pulse generator 66 is triggered by the leading edge of the HIGH level gate signal of the NOR gate to output the shot pulse serving as the reset pulse $S_1$. Therefore, the sample hold circuit 77 and the integrator circuit 73 are reset. At the same time, the instantaneous wheel speed $Vw_1$ at the time $t_3$ is sampled and held in the sample hold circuit 77 as the renewed sample value Vs. By renewing the sample value Vs, the vehicle speed representing value $Vi_1$ becomes equal to the instantaneous wheel speed value $Vw_1$ and thus establishes $Vw_1 \geq Vi + 1$ km/h. Therefore, the comparator signal $c_1$ again turns ON at the time $t_3$. Similarly to the control behavior at the period from $t_1$ to $t_3$, the gate signal of the OR gate 65 is held HIGH for the $T_3$ period by HIGH level timer signal of the timer 64. Similarly, at the time $t_4$, the shot-pulse generator 66 is triggered to output the reset signal $S_1$ to renew the sample value Vs by the instantaneous wheel speed $Vi_1$ at the time $t_4$. After the time $t_4$, the sampled value Vs is maintained constant for the given period $T_3$ by the HIGH level timer signal of the timer 64. Before the HIGH level timer signal terminates, the shot pulse as the reset signal is generated by the shot pulse generator 66, as shown in FIG. 8. While the interval of the shot pulse of the shot pulse generator 66 is shorter than the timer period $T_3$, the integrated value of the integrator 73 is maintained zero. Therefore, the adder outputs the sampled value Vs as the vehicle speed representing value $Vi_1$.

After a time $t_5$, at which the reset signal $s_1$ is produced for resetting the sample hold circuit 77 and the intergrator 73, the gate signal of the OR gate turns LOW at a time $t_6$ after expiration of the timer period $T_3$. During the period between the times $t_5$ and $t_6$, the wheel speed $Vw_1$ drops to be lower than ($Vi_1 - 1$ km/h). Since the wheel speed $Vw_1$ is maintained lower than the value ($Vi_1 - 1$ km/h) at the time $t_6$, the comparator signal $c_1$ of the comparator 59 is maintained LOW and the comparator signal $c_2$ of the comparator 60 is maintained HIGH. Therefore, the analog switch 71 is held OFF and the analog switch 72 is turned ON. Therefore, a value corresponding to a predetermined deceleration magnitude of $-1.2$ G is input through the analog switch 72. Consequently, the integrated value in the integrator 73 becomes negative. The negative integrated value is summed with the sample value Vs which corresponds to the instantaneous wheel speed $Vw_1$ at a time $t_5$ to gradually reduce the value of the vehicle speed representing value $Vi_1$. At a time $t_7$, the wheel speed $Vw_1$ is increased across the value ($Vi_1+1$ km/h). As a result, the reset signal $s_1$ is generated by the shot pulse generator 66. Then sample hold circuit 77 and the integrator 73 are thus reset.

At a time $t_8$, braking operation is initiated to abruptly decelerate the vehicle. As a result, the wheel speed $Vw_1$ drops across the value of ($Vi_1-1$ km/h). By this, the comparator signal $c_2$ of the comparator rises to HIGH level to destroy the NOR condition at the NOR gate 63. Therefore, the NOR gate signal of the NOR gate turns into LOW level. The timer 64 is thus triggered by the trailing edge of the HIGH level NOR gate signal to output HIGH level timer signal for the timer period $T_3$. After expiration of the timer period $T_3$, the value corresponding to the deceleration magnitude of $-1.2$ G is input to the integrator. Therefore, the vehicle speed representing value $Vi_1$ is gradually decreased.

Figure 11:
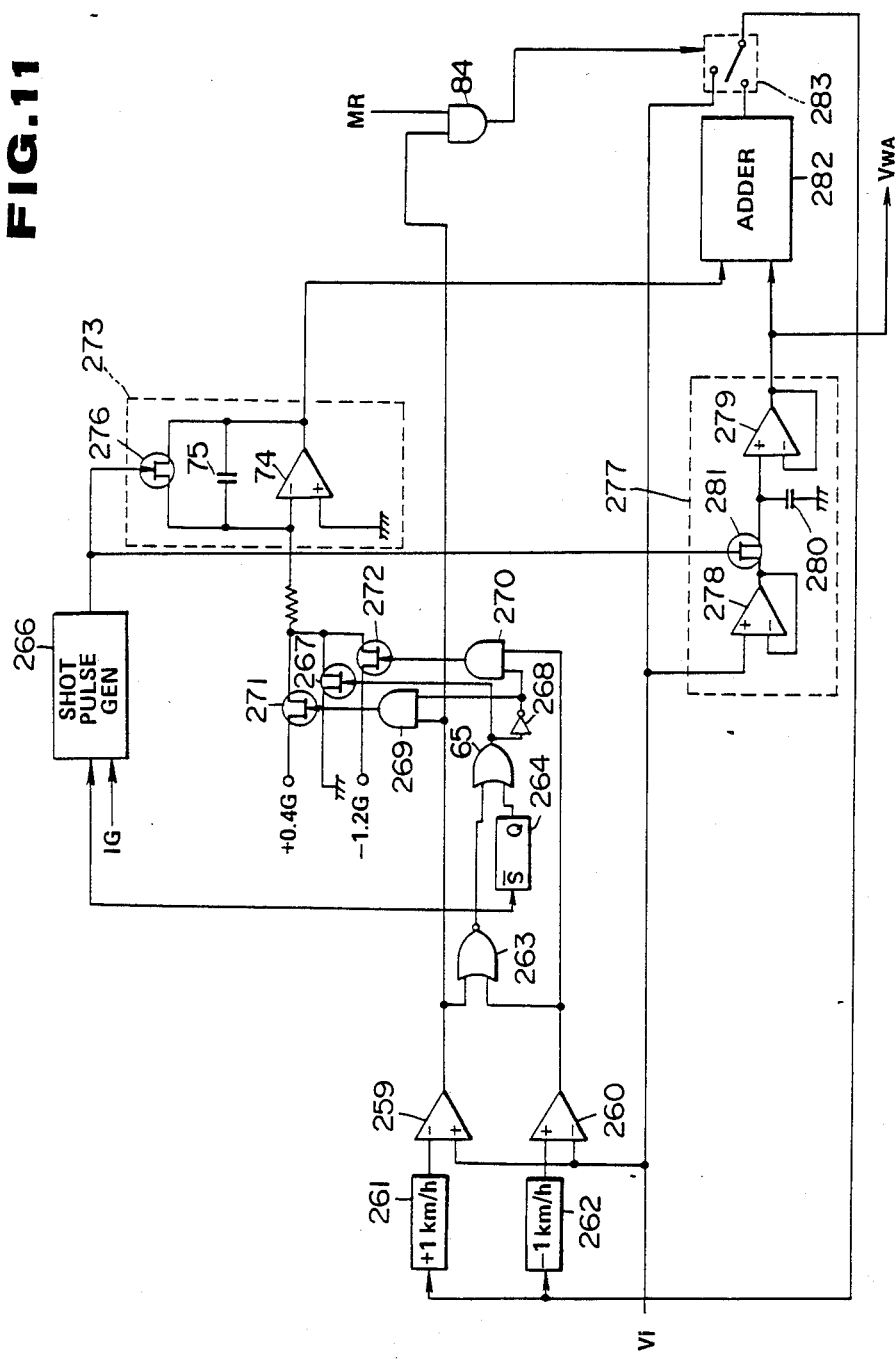
FIG. 11 is a block diagram of the preferred embodiment of an initial wheel speed derivation circuit to be employed in the preferred embodiment of the anti-skid brake control system of FIG. 1.

FIG. 11 shows the detailed construction of the initial wheel speed value derivation circuit 104. As set forth above, the initial wheel speed derivation circuit 104 derives a initial wheel speed indicative data $Vw_A$ based on the instantaneous wheel speed $Vw_1$ upon initiation of braking operation. In order to perform derivation of the initial wheel speed indicative data $Vw_A$, the initial wheel speed derivation circuit 104 is connected to the select-HIGH switch 58 to receive therefrom the common vehicle speed representing value Vi. The initial wheel speed derivation circuit 104 includes comparators 259 and 260. The comparator 259 has a non-inverting input terminal connected to the select-HIGH switch 58 to receive therefrom the common vehicle speed representing value Vi. On the other hand, the comparator 260 is connected to the select-HIGH switch 58 at an inverting input terminal. An inverting input terminal of the comparator 259 is connected to output terminal of select-HIGH switch 58 through which the common vehicle speed representing value Vi is output, through an adder 261. On the other hand, the non-inverting input terminal of the comparator 260 is connected to the output terminal of the select-HIGH switch 58 through a subtractor 262. The adder 261 is designed to add a given value corresponding to 1 km/h of vehicle speed to the initial wheel speed indicative data $Vw_A$ for providing dead band of +1 km/h. The value as the sum of the initial wheel speed indicative data $Vw_A$ and the dead band value 1 km/h will be hereafter referred to as higher initial wheel speed reference value. Similarly, the subtractor 262 subtracts a given value corresponding to 1 km/h of the vehicle speed from the initial wheel speed indicative data $Vw_A$ for providing dead band of $-1$ km/h. The value as the difference of the initial wheel speed indicative data $Vw_A$ and the dead band value $-1$ km/h will be hereafter referred to as lower initial wheel speed reference value". The comparator 259 outputs HIGH level comparator signal when the common vehicle speed representing value Vi is higher than or equal to the higher initial wheel speed reference value (Vi +1 km/h). In other words, the comparator signal level of the comparator 259 is held LOW as long as the common vehicle speed representing value Vi is maintained lower than the higher initial wheel speed reference value ($Vw_A+1$ km/h). The comparator 260 outputs HIGH level comparator signal when the common vehicle speed representing data Vi is lower than to the lower initial wheel speed reference value ($Vw_A-1$ km/h). In other words, the comparator signal level of the comparator 260 is held LOW as long as the common vehicle speed representing data Vi is maintained higher than or equal to the lower initial wheel speed reference value ($Vw_A-1$ km/h).

The output terminals of the comparators 259 and 260 are connected to input terminals of NOR gate 263 to feed the comparator signals $c_{11}$ and $c_{12}$ thereto. The NOR gate 263 outputs HIGH level gate signal while signal levels of both of the comparator signals $c_{11}$ and $c_{12}$ are maintained LOW. Namely, the gate signal output from the NOR gate 263 is held LOW while the common vehicle speed representing value Vi is maintained higher than or equal to the lower initial wheel speed reference value $Vw_A$ 1 km/h and lower than the higher initial wheel speed reference value ($Vw_A+1$ km/h). The gate signal of the NOR gate 263 is fed to a timer 264, an OR gate 265 and a shot-pulse generator 266, respectively. The timer 254 is responsive to the trailing edge of the HIGH level NOR gate signal to output a timer signal for a given period of time $T_{13}$, e.g. 0.1 sec. The timer signal is fed to the OR gate 265.

The OR gate 265 thus receives the NOR gate signal at one input terminal and the timer signal from the timer 264 at the other input terminal. An OR gate signal of the OR gate 265 is transmitted to a gate of an analog switch 267 as a selector signal $S_{13}$. The output terminal of the OR gate 265 is also connected to one input terminal of an AND gates 269 and 270 via an inverter 268. The other input terminal of the AND gate 269 is connected to the output terminal of the comparator 259 to receive therefrom the comparator signal $c_{11}$. Similarly, the other input terminal of the AND gate 270 is connected to the output terminal of the comparator 260 to receive the comparator signal $c_{12}$ therefrom. Therefore, the gate signal $S_{12}$ of the AND gate 269 becomes HIGH while the comparator signal $c_{11}$ is maintained at HIGH level and the NOR gate signal is held LOW. The gate signal $S_{12}$ serves as a selector signal. On the other hand, the gate signal $S_{14}$ of the AND gate 270 becomes HIGH level while the comparator signal $c_{12}$ is maintained HIGH and the NOR gate signal is held LOW. This gate signal $S_{14}$ also serves as selector signal. The AND gates 269 and 270 are connected to gates of analog switches 271 and 272.

The analog switch 267 is turned ON in response to HIGH level selector signal $S_{13}$ to drop the supply voltage to an integrator circuit 273 to zero. On the other hand, the analog switch 271 is turned ON in response to the HIGH level selector signal $S_{12}$ to supply a voltage E corresponding to a possible maximum wheel acceleration, e.g. 0.4 G, to the integrator circuit 273. The analog switch 272 is likewise turned ON in response to the HIGH level selector signal $S_{14}$ to supply a voltage corresponding to possible minimum wheel acceleration value, e.g. $-1.2$ G, to the integrator circuit 273.

The integrator circuit 273 has a per se well known construction and is consisted of an amplifier 274, a capacitor 275 and an analog switch 276. The gate of the analog switch 276 is connected to the shot-pulse generator 266 to receive therefrom a shot-pulse which serves as a reset signal $S_{11}$. The integrator 273 is reset by the HIGH level reset signal $S_{11}$ and is responsive to the trailing edge of the HIGH level reset signal to reset the integrated value. The integrator circuit 273 integrates the supply voltage E after termination of the HIGH level reset signal $S_{11}$ to output the integrator signal. The shot-pulse generator 266 is responsive to an ON-set signal IG of an ignition switch to generate a first shot pulse as the first reset signal for resetting the integrator circuit 273. The shot-pulse generator 265 subsequently generate the shot-pulses serving as the reset signal $S_{11}$ at every leading edge of the HIGH level NOR gate signal. As set forth above, since the NOR gate signal becomes HIGH when the common vehicle speed representing value Vi satisfies $(Vw_A-1$ km/h$) \leq Vi < (Vw_A+1$ km/h$)$, the integrated value of the integrator 273 is reset every occurrence of the common vehicle speed representing value Vi in the aforementioned range. The reset signal $S_{11}$ of the shot-pulse generator 266 is also supplied to a sample hold circuit 277. The sample hold circuit 277 comprises a buffer amplifiers 270 and 279, a capacitor 280 and an analog switch 281. The analog switch 281 is connected to the shot-pulse generator 266 to receive the reset signal $S_{11}$ at the gate thereof to be turned ON. The sample hold circuit 277 is responsive to turning ON of the analog switch 281 to reset the held wheel speed value. The sample hold circuit 277 in absence of the reset signal $S_{11}$ from the shot-pulse generator 266, samples and holds the instantaneous common vehicle speed representing value Vi at the occurrence of the reset signal as a sample value Vs. The sample hold circuit 277 outputs a sample/hold signal having a value indicative of the sample value Vs to an adder 282. The adder receives the sample/hold signal from the sample hold circuit 277 and integrator signal from the integrator 273. As will be appreciated, the integrator signal has a value indicative of an integrated value $$Ve \left( = \int_0^t (-E) \cdot dt \right).$$

Therefore, the adder 282 adds the integrated value Ve to the sample value Vs to derive the initial wheel speed indicative data $Vw_A$. The output terminal of the adder 282 is connected to a switching circuit 283. The switching circuit 283 is also directly connected to the select-HIGH switch 58 to be input the common vehicle speed representative value Vi. On the other hand, the switching circuit 283 also connected to an AND gate 284. The AND gate 284 has one input terminal connected to a retriggerable timer 30 to receive therefrom the pump drive signal MR. The other input terminal of the AND gate 284 is connected to the output terminal of the comparator 259. The AND gate 284 controls the switch position of the switching circuit 283 to selectively connect the adder 282 or the select-HIGH switch 58 to the adder 261 and the subtractor 262 to supply the output as the initial wheel speed indicative data $Vw_A$. On the other hand, a junction between the sample hold circuit 277 and the adder 282, is connected to the target speed derivation circuit 28a for supplying the initial wheel speed indicative data $Vw_A$.

Namely, the gate signal of the AND gate is normally maintained LOW level due to absence of the HIGH level pump drive signal MR. The gate signal of the AND gate is also held LOW level while the wheel acceleration is negative or that the common vehicle speed representing value Vi is lower than the $Vw_A+1$ km/h value as compared in the comparator 259. While the gate signal is held LOW, the switching circuit 282 is held at a first switch position where the adder 282 which is normally connected to the output terminal of the initial wheel speed derivation circuit 104 therethrough, is connected to the adder 261 and the subtractor 262. On the other hand, when the HIGH level pump drive signal MR and the HIGH level comparator signal of the comparator 259 are both input to the AND gate, the gate signal of the AND gate 284 turns HIGH to switch the switching circuit 283 to a second switch position where the select-HIGH switch 58 is directly connected to the adder 261 and the subtractor 262.

The operation of the initial wheel speed derivation circuit will be discussed hereinbelow with reference to FIG. 12. When the common vehicle speed representing data Vi varies as shown by solid line in FIG. 12, the output of the switching circuit 283 varies as illustrated by the broken line. At the same time, the sample hold value Vs of the sample hold circuit 277 varies as illustrated by one-dotted line of FIG. 12.

Figure 12:
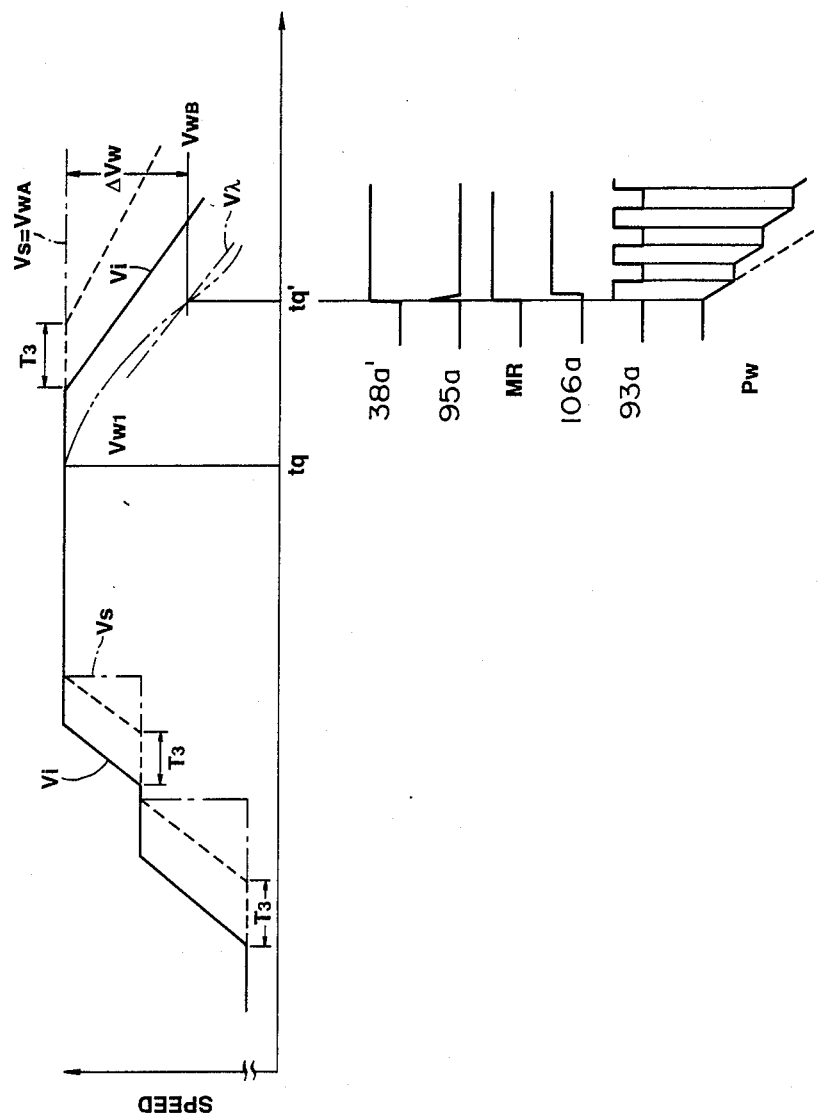
FIG. 12 is a timing chart showing operation of the initial wheel speed derivation circuit of FIG. 11.

Assuming the vehicular braking operation is initiated at a timing $t_9$ to cause deceleration of the front-right wheel for lowering of the front-right wheel speed $Vw_1$ as illustrated by two-dotted line in FIG. 12, the sample hold value Vs of the sample hold circuit 277 which is held at constant value, serves as the initial wheel speed indicative data $Vw_A$.

Subsequently, the wheel speed $Vw_1$ drops across the target wheel speed $V\lambda$ to initiate RELEASE mode operation in anti-skid brake control at a time $t_9'$, then the instantaneous wheel speed indicative signal value $Vw_1$ as the initial timing wheel speed indicative data $Vw_B$ is latched and compared with the initial wheel speed indicative data $Vw_A$ to derive a difference $\Delta Vw$ therebetween. Based on the derived difference $\Delta Vw$, discrimination is made whether the vehicle is in the high friction road or low friction road for selecting one of HIGH and LOW level control signal $S_5$. During this period, the vehicle speed representing value Vi is output as shown in FIG. 12 so as to derive the target wheel speed $V\lambda$ based thereon. After the timing $t_9'$, the switching circuit 283 is switched to connect the adder 282 to the adder 261 and the subtractor 262.

Figure 13:
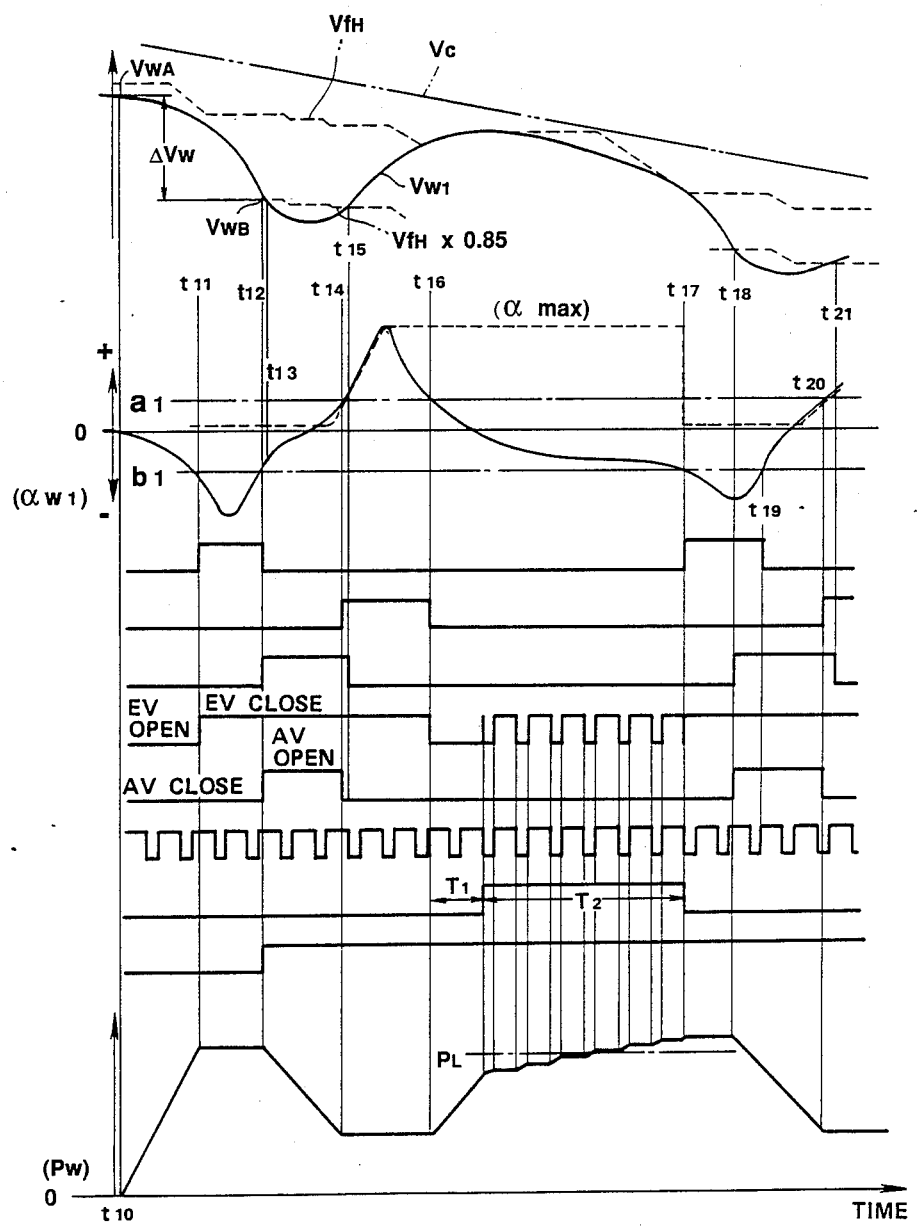
FIG. 13 is a timing chart showing operation of the anti-skid brake control to be performed by the wheel slip control system of FIG. 1 for controlling braking pressure for rear wheels.

FIG. 13 shows a timing chart of the operation of the controller channel 18a in anti-skid brake control for the rear wheels.

It is assumed that vehicular brake is applied for deceleration of the vehicle at a time $t_{10}$, hydraulic braking pressure is built up and distributed to all of the wheel cylinders 1a, 2a, 3a and 4a in common. According to increasing of the braking pressure in the wheel cylinders 3a and 4a, the rear wheels 3 and 4 are decelerated.

At a time $t_{11}$, the wheel acceleration $\alpha w_3$ decreases across the wheel deceleration threshold $-b$. This results in initiation of anti-skid brake control. Namely, since the wheel acceleration $\alpha w_3$ becomes smaller than the wheel deceleration threshold $-b$, the comparator signal of the comparator 33c turns into HIGH level. This turns the gate signals of the OR gates 36c, 40c and 40d into HIGH level. Therefore, the inlet control signal $EV_3$ output through the amplifier 37c turns HIGH level. Therefore, both of the EV valves 19c and 19d are shut at the time $t_{11}$. At this time, since the output of the AND gate 38c is held LOW level, the outlet control signal $AV_3$ is held LOW. Therefore, the AV valves 20c and 20d are also maintained at closed position. Therefore, the anti-skid brake control valve assemblies 17c and 17d are placed in HOLD mode position. The braking pressure in the wheel cylinders 3a and 4a are thus held constant at the pressure level at the time $t_{11}$.

For the initial cycle of the anti-skid brake control, the vehicle speed representing value Vi is derived by the vehicle speed representing value derivation system 27a, 27b and 27c. The greatest one of the vehicle speed representative values $V_{f1}$, $V_{f2}$ and $V_{f3}$ is selected by the select-HIGH switch 58. The vehicle speed representative select-HIGH output $V_{fH}$ is fed to the select-HIGH switch 87 and the vehicle speed representative value correction circuit 86. The select-HIGH switch 87 selects greater one of the vehicle speed representative select-HIGH output $V_{fH}$ of the select-HIGH switch 58 and the modified vehicle speed representative value $V_r$ of the vehicle speed representative value correction circuit 86 as the common vehicle speed representative value Vi. Based on the common vehicle speed representing value Vi, the target wheel speed $V\lambda_3$ is derived at a value 85% of Vi. As described above, since the vehicle speed representing value decreases according to the integrated value of the integrator 73, the target wheel speed $V\lambda_3$ decreases continuously. At a time $t_{12}$, the lower rear wheel speed $Vw_R$ decelerated across the target wheel speed $V\lambda_3$. Then, the comparator signal of the comparator 35c turns into HIGH level. At this time, since the comparator signal of the comparator 34c is held LOW to apply HIGH level input to the AND gate 38c through the inverting input terminal, AND condition is established at the AND gate 38c. Therefore, the gate signal of the AND gate 38c turns into HIGH level to cause HIGH level outlet control signal $AV_3$. This operates the anti-skid brake control valve assemblies 17c and 17d into the RELEASE mode position. Therefore, the braking pressure in the wheel cylinders 3a and 4a are released by feeding back the pressurized braking fluid to the pressure accumulators 22c and 22d. At the same time, by the HIGH level outlet control signal $AV_3$, the retriggerable timer 30 is triggered to start outputting of the pump drive signal MR. Therefore, the pump motor 24 is start driving to drive the fluid pumps 21c and 21d.

It should be appreciated that, during the aforementioned RELEASE mode operation, when the judgement is made that the vehicle is traveling on low friction road, the RELEASE mode control signal is maintained LOW level to output the HIGH level outlet control signal $AV_1$ which is constantly held HIGH level for normal RELEASE mode operation. On the other hand, when the road surface is high friction condition, the RELEASE mode control signal is maintained HIGH level to order controlled RELEASE mode operation for decreasing the braking pressure in the wheel cylinder 1a in stepwise fashion and moderately.

By decreasing the braking pressure in the wheel cylinders 3a and 4a, the wheel speed $Vw_3$ are resumed and therefore wheel acceleration $\alpha w_3$ is increased. The wheel acceleration $\alpha w_3$ increases across the wheel deceleration threshold $-b$ at a time $t_{13}$. Therefore, the comparator signal of the comparator 33c turns into LOW level at the time $t_{13}$. However, at this time, since the HIGH level comparator signal is input to the OR gate 36 is maintained HIGH level. Therefore, the gate signal of the OR gate 40c is held HIGH to maintain the inlet control signal $EV_3$ at HIGH level. Therefore, the anti-skid control valve assemblies 17c and 17d are maintained at the RELEASE mode, at the time $t_{13}$. Thus, the wheel speeds $Vw_3$ are continued to increase. Accordingly, the wheel acceleration $\alpha w_3$ increases. At a time $t_{14}$, the wheel acceleration $\alpha w_3$ increases across the wheel acceleration threshold $+a$. This results in HIGH level comparator signal of the comparator 34c. This HIGH level comparator signal of the comparator 34c turns the input level at the inverting input terminal of the AND gate 38c into LOW level. Therefore, the AND gate signal of the AND gate 38c turns into LOW level. Therefore, the outlet control signal $AV_3$ turns into LOW level to close the AV valves 20c and 20d in the anti-skid brake control valve assemblies 17c and 17d. As a result, the anti-skid brake control valve assemblies 17c and 17d are again placed into the HOLD mode to maintain the braking pressure level constant at the pressure level at the time $t_{14}$. By holding the braking pressure at decreased level, the wheel speed $Vw_3$ still increases. Also, according to increasing of the wheel speed, wheel acceleration $\alpha w_3$ increases toward the peak $\alpha w_{max}$. As seen from FIG. 10, the rear wheel speed $Vw_3$ increases across the target wheel speed $V\lambda_3$ at a time $t_{15}$. This results in LOW level comparator signal of the comparator 35c. After this, at a time $t_{16}$, the wheel acceleration $\alpha w_3$ drops across the wheel acceleration threshold $+a$. In response to drop of the wheel acceleration $\alpha w_3$ across the wheel acceleration threshold $+a$, the comparator signal of the comparator 34c turns into LOW level. Therefore, the all of the inputs to the OR gate 36c becomes LOW level. Therefore, the OR gate signal of the OR gate 36c turns into LOW level to cause LOW level inlet control signal $EV_3$ at the time $t_{16}$. At the same time, the variable timer 42c is activated by the trailing edge of the HIGH level comparator signal of the comparator 34c to output HIGH level timer signal for a period $T_2$ after a delay time $T_1$ which is variable depending upon the wheel acceleration peak value as latched by the peak hold circuit 44c. During the period $T_2$, the oscillator 43c is triggered to output constant pulse signals. As will be appreciated, while the pulse signal is maintained ON (HIGH) level, AND conditions are established in the AND gate 41c to maintain the inlet control signal $EV_3$ at HIGH level. Therefore, during the delay time $T_1$, the anti-skid brake control valves 17c and 17d are held in APPLICATION mode to increase the braking pressure. On the other hand, during the period $T_2$, the operation mode of the anti-skid brake control valves 17c and 17d are alternated between APPLICATION mode and HOLD mode repeatedly.

At a time $t_{17}$, the wheel acceleration $\alpha w_3$ drops across the wheel deceleration threshold $-b$. Therefore, another cycle of anti-skid brake control is initiated. At the same time, the peak hold circuit 44c is reset by the leading edge of the HIGH level comparator signal of the comparator 33c. Thereafter, one skid cycle of anti-skid brake control operation is performed during the period $t_{17}$ to $t_{22}$.

As will be appreciated herefrom, the anti-skid brake control to be taken place for releasing the braking pressure in both of the rear wheel cylinders in response to decreasing of the lower rear wheel speed $Vw_R$ across the target wheel speed $V\lambda_3$ in synchronism with each other and at the same rate. On the other hand, in the APPLICATION mode, the braking pressures in the rear wheel cylinders are built up at different rate to each other. As a result, when one of the wheel is decelerated across the target wheel speed, the other wheel is rotating at higher speed than the target wheel speed. Therefore, it is successfully avoided to cause locking of both wheels at the same time. This assures derivation of the vehicle speed representing value $Vi_3$ at the value precisely reflecting the vehicle speed to allow precise control for the brake.

After the time $t_{15}$, the wheel acceleration $\alpha w_1$ reaches the peak. The peak value is held by the peak hold circuits 44a and 44b. Therefore, the input level at the inverting input terminals of the comparators 93a and 93b are increased to ¾ of the held peak value $\alpha w_{max}$.

As seen from FIG. 13, the peak value $\alpha w_{max}$ as held in the peak hold circuits 44a and 44b are different from each other. Namely, in the shown example, the peak value $\alpha w_{max}$ held in the peak hold circuit 44a is smaller than that of the peak hold circuit 44b.

At a time $t_{16}$, the wheel acceleration $\alpha w_1$ decreases across the wheel acceleration threshold $+a$. As a result, the anti-skid brake control valves 17a and 17b are operated into APPLICATION mode to increase the braking pressure in the wheel cylinders 1a and 2a in stepwise fashion by alternating the anti-skid brake control valve positions between APPLICATION mode position and HOLD mode position. During this period, the LOW level OR gates signals of the OR gates 40a and 40b are applied to the input terminal of the counters. Therefore, the counters integrate a predetermined unit value to produce counter signals. The counter values of the counters are compared with the ¾ of the peak values $\alpha w_{max}$ in the comparators. The counter values of the counters reaches the $\frac{3}{4} \times \alpha w_{max}$ values at a time $t_{16}$. Therefore, the comparator signals of the comparators turns into HIGH level.

While the difference of the counter values of the counters as derived by the subtractor is held smaller than a given value, the comparator maintains HIGH level comparator signal. Therefore, the gate signal of the AND gates turns into HIGH level. At the time $t_{16}$, the inputs for the AND gate from the inverters are held HIGH level and the input for the AND gate from the inverter is held HIGH level. However, since the inverted input from the inverter turns LOW level, the AND gate is held the gate signal level at LOW level. Therefore, only timer is triggered to output the HIGH level timer signal for the given period of time. The HIGH level timer signal is fed to the input terminal of the OR gate to maintain the gate signal of the OR gate at HIGH level. As a result, the inlet control signal $EV_2$ for the anti-skid brake control valve 17b is maintained HIGH level.

On the other hand, since the gate signal of the AND gate 92a is maintained at LOW level as set forth above, the timer signal of the timer is maintained LOW level to allow altering of the gate signal of the AND gate 41a between HIGH and LOW levels to alternate the inlet control signal between HIGH and LOW levels to increase the braking pressure in the wheel cylinder 1a in stepwise fashion.

Therefore, after the time $t_{16a}$, the braking pressure in the wheel cylinder 1 is continued to increase and the braking pressure in the wheel cylinder 2 is maintained at constant level for the period.

As will be seen from FIG. 13, by continuing increasing of the braking pressure, the wheel speed $Vw_1$ is decreased and the wheel acceleration $\alpha w_1$ drops across the wheel deceleration threshold $-b$ to turn the comparator signal of the comparator 33a into HIGH level, at a time $t_{16b}$. Subsequently, the wheel speed $Vw_1$ decreases across the target wheel speed $V\lambda_1$ to turn the comparator signal of the comparator 35a into HIGH level. As a result, the counter is reset by the leading edge of the HIGH level comparator signal from the comparator 35a.

After the given period and at a time $t_{16c}$, the timer signal of the timer turns LOW level to allow alternating the gate signal level of the OR gate between HIGH and LOW levels. Therefore, the fluid pressure in the wheel cylinder 2a increases in stepwise fashion.

In the shown example, the counter value of the counter again reaches the $\frac{3}{4} \times \alpha w_{max}$ at a time $t_{16d}$. However, at this time, since the difference of the counter values of the counters are held greater than the given value, the comparator signal of the comparator is maintained LOW level. Therefore, the timers are not triggered.

Therefore, simultaneous locking of the front wheels can be successfully avoided.

While the present invention has been disclosed in detail in terms of the preferred embodiment which implements the best mode of the invention, the present invention should not be limited to the specific embodiment set forth above. Namely, the various components constituting the anti-skid brake control system can be replaced with other components or other constructions of components which can implement the equivalent operations. Furthermore, the whole system which can perform the equivalent operation to that set forth above may also be included in the scope of the invention.

Figure 14:
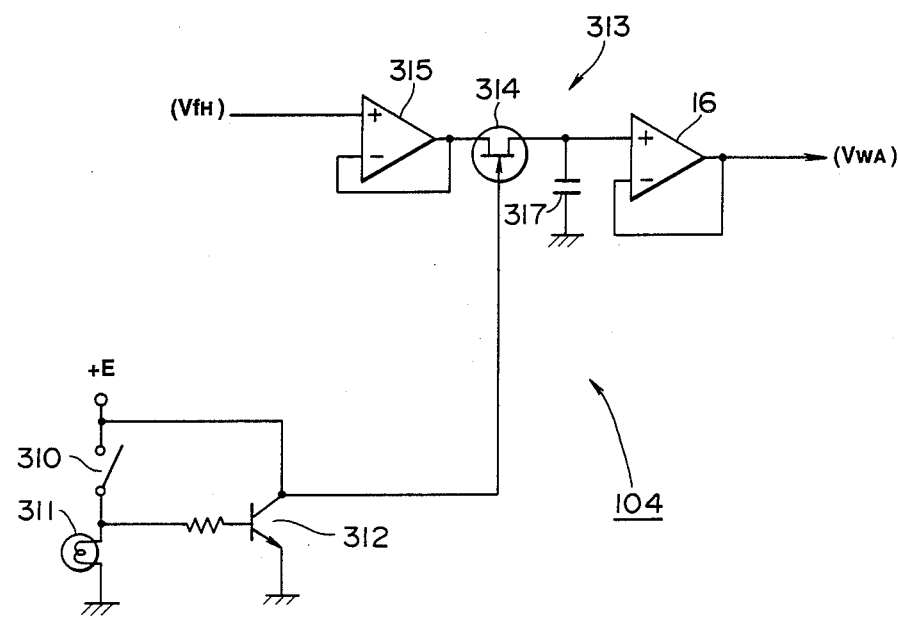
FIG. 14 is a circuit diagram showing modification of the initial wheel speed derivation circuit to be employed in the preferred embodiment of the anti-skid brake control system according to the invention.

For example, as shown in FIG. 14, the initial wheel speed deriving circuit 104 may also comprise a sample hold circuit 313 including a buffer amplifier 315, an analog switch 314, a capacitor 317 and a buffer amplifier 316. The buffer amplifier 315 is connected to the select-HIGH switch 58 to receive therefrom the common vehicle speed representing data Vi. On the other hand, the analog switch 314 has a source connected to the collector electrode of a transistor 312 which has a base electrode connected to a junction between a brake switch 310 and a stop indicator lamp 311. With this circuit, the sample hold circuit 313 continuously samples the common vehicle speed representing value Vi and responsive to turning ON of the analog switch in response to truning ON of the transistir 313 to latch the instantaneous value of the common vehicle speed representing value Vi for outputting the latched value as the initial wheel speed indicative data $Vw_A$. This also enabled implementation of the present invention.

What is claimed is:

1. An anti-skid brake control system for an automotive vehicle, comprising:

a braking circuit including a wheel cylinder for generating braking force for decelerating a vehicular wheel in response to a manual braking operation;

a pressure control valve disposed within said braking circuit for controlling braking force to be generated in said wheel cylinder depending upon the vehicular braking condition, said pressure control valve increasing said braking force in said wheel cylinder in a first mode and decreasing said braking force in said wheel cylinder in a second mode;

a wheel speed data generating means for monitoring rotation speed of said vehicular wheel to produce a wheel speed indicative data;

first means deriving a vehicular braking condition on the basis of said wheel speed indicative data for outputting a control signal for controlling operational mode of said pressure control valve means according to a predetermined schedule in each skid control cycle, in which the pressure control valve operational mode is selected between said first mode and second mode according to the predetermined schedule, and second means responsive to initiation of vehicular braking operation for monitoring variation of said wheel speed indicative data for detecting friction level of a road surface for adjusting variation rate of said braking pressure in said wheel cylinder in said second mode.

2. An anti-skid brake control system as set forth in claim 1, wherein said second means is active for the first cycle of skid control operation for selecting deceleration rate in said second mode.

3. An anti-skid brake control system as set forth in claim 2, wherein said second means monitors variation of wheel speed indicative data during a period from initiation of the vehicular braking operation to initiation of said second mode operation in the first skid control cycle for deriving a discrimination data and detects said road friction level on the basis of said discrimination data.

4. An anti-skid brake control system as set forth in claim 3, wherein said second means detects said discrimination data representative of a friction level higher than a predetermined friction criterion for selecting a first smaller variation rate and otherwise selecting a second greater variation rate.

5. An anti-skid brake control system as set forth in claim 4, wherein said pressure control valve linearly decreases said braking pressure at a predetermined pressure decreasing gradient when said second greater variation rate is selected and intermittently decreases said braking pressure at said predetermined pressure decreasing gradient with a given interval in which the braking pressure is maintained constant when said first smaller variation rate is selected.

6. An anti-skid brake control system as set forth in claim 4, wherein said pressure control valve linearly decreases said braking pressure at a predetermined pressure decreasing gradient when said normal decreasing mode is selected and intermittently decreases said braking pressure at said predetermined pressure decreasing gradient with a given interval in which the braking pressure is maintained constant when said controlled decreasing mode is selected.

7. An anti-skid brake control system for an automotive vehicle, comprising:
a braking circuit including a wheel cylinder for generating braking force for decelerating a vehicular wheel in response to a manual braking operation;
a pressure control valve disposed within said braking circuit for controlling braking force to be generated in said wheel cylinder depending upon the vehicular braking condition, said pressure control valve increasing said braking force in said wheel cylinder in a first mode, decreasing said braking force in said wheel cylinder rate in a second mode in which decreasing rate is set at a first given rate in a normal decreasing mode and at a second given rate smaller than said first given rate in a controlled decreasing mode;
a wheel speed data generating means for monitoring rotation speed of said vehicular wheel to produce a wheel speed indicative data;
first means deriving a vehicular braking condition on the basis of said wheel speed indicative data for outputting a control signal for controlling operational mode of said pressure control valve means according to a predetermined schedule in each skid control cycle, in which the pressure control valve operational mode is selected between said first mode and second mode according to the predetermined schedule, and
second means responsive to initiation of vehicular braking operation for detecting road friction level representative parameter on the basis of said wheel speed indicative data for selecting one of said normal decreasing mode and said controlled decreasing mode in said second mode.

8. An anti-skid brake control system as set forth in claim 7 wherein said second means is active for the first cycle of skid control operation for selecting one of said normal decreasing mode and said controlled decreasing mode.

9. An anti-skid brake control system as set forth in claim 8, wherein said second means monitors variation of wheel speed indicative data during a period from initiation of the vehicular braking operation to initiation of said second mode operation in the first skid control cycle for deriving a discrimination data and detects said road friction level on the basis of said discrimination data.

10. An anti-skid brake control system as set forth in claim 9, wherein said second means detects said discrimination data representative of a friction level higher than a predetermined friction criterion for selecting said controlled decreasing mode and otherwise selecting said normal decreasing mode.

11. An anti-skid brake control system for an automotive vehicle, comprising:
a braking circuit including a wheel cylinder for generating braking force for decelerating a vehicular wheel in response to a manual braking operation;
a pressure control valve disposed within said braking circuit for controlling braking force to be generated in said wheel cylinder depending upon the vehicular braking condition, said pressure control valve increasing said braking force in said wheel cylinder in a first mode, decreasing said braking force in said wheel cylinder rate in a second mode in which decreasing rate is set at first given rate in a normal decreasing mode and at a second given rare smaller than said first given rate in a controlled decreasing mode;
a wheel speed data generating means for monitoring rotation speed of said vehicular wheel to produce a wheel speed indicative data;
first means deriving a vehicular braking condition on the basis of said wheel speed indicative data for outputting a control signal for controlling operational mode of said pressure control valve means according to a predetermined schedule in each skid control cycle, in which the pressure control valve operational mode is selected between said first mode and second mode according to the predetermined schedule, and
second means responsive to initiation of vehicular braking operation for sampling a first wheel speed data and responsive to said control signal ordering said second mode in a first skid control cycle for sampling a second wheel speed data, said second means comparing said first and second wheel speed data for detecting road friction level representative parameter on the difference between said first and second wheel speed data for selecting one of said normal decreasing mode and said controlled decreasing mode in said second mode depending upon said difference.

* * * * *